(12) United States Patent
Nagasawa

(10) Patent No.: US 8,804,338 B2
(45) Date of Patent: Aug. 12, 2014

(54) HEAT PIPE DOCKING SYSTEM

(75) Inventor: Hideo Nagasawa, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 313 days.

(21) Appl. No.: 13/496,702

(22) PCT Filed: Sep. 17, 2010

(86) PCT No.: PCT/US2010/049303
§ 371 (c)(1),
(2), (4) Date: May 29, 2012

(87) PCT Pub. No.: WO2011/035137
PCT Pub. Date: Mar. 24, 2011

(65) Prior Publication Data
US 2012/0236501 A1    Sep. 20, 2012

(30) Foreign Application Priority Data
Sep. 17, 2009    (JP) .................................. 2009-215727

(51) Int. Cl.
*H05K 7/20* (2006.01)
*G06F 1/20* (2006.01)

(52) U.S. Cl.
USPC ...... 361/704; 361/679.54; 361/715; 165/185; 700/300; 710/300; 713/320

(58) Field of Classification Search
USPC .................... 361/679.54, 704, 715; 165/185; 700/300; 710/300; 713/320
See application file for complete search history.

(56) References Cited

U.S. PATENT DOCUMENTS

| | | | | |
|---|---|---|---|---|
| 5,752,011 A | * | 5/1998 | Thomas et al. | 713/501 |
| 5,974,556 A | * | 10/1999 | Jackson et al. | 713/322 |
| 6,047,766 A | * | 4/2000 | Van Brocklin et al. | 165/104.26 |
| 6,118,654 A | | 9/2000 | Bhatia | |
| 6,167,955 B1 | * | 1/2001 | Van Brocklin et al. | 165/272 |
| 6,172,871 B1 | * | 1/2001 | Holung et al. | 361/679.47 |
| 6,181,553 B1 | * | 1/2001 | Cipolla et al. | 361/679.54 |
| 6,313,987 B1 | * | 11/2001 | O'Connor et al. | 361/679.46 |
| 6,453,378 B1 | * | 9/2002 | Olson et al. | 710/304 |
| 6,560,104 B2 | * | 5/2003 | DeHoff et al. | 361/679.52 |
| 6,601,179 B1 | * | 7/2003 | Jackson et al. | 713/322 |
| 6,691,197 B2 | * | 2/2004 | Olson et al. | 710/304 |
| 6,714,891 B2 | * | 3/2004 | Dendinger | 702/132 |
| 6,760,649 B2 | * | 7/2004 | Cohen | 700/299 |
| 6,829,142 B2 | * | 12/2004 | Belady et al. | 361/679.47 |
| 6,928,565 B2 | * | 8/2005 | Watts et al. | 713/322 |
| 7,227,749 B2 | * | 6/2007 | Rockenfeller | 361/688 |
| 7,363,517 B2 | * | 4/2008 | Bodas | 713/300 |

(Continued)

FOREIGN PATENT DOCUMENTS

WO    WO 2008/152439 A1    12/2008

OTHER PUBLICATIONS

International Search Report for PCT/US2010/049303.

*Primary Examiner* — Robert J Hoffberg
(74) *Attorney, Agent, or Firm* — Timothy M. Morella

(57) ABSTRACT

To provide electronic equipment having a heat discharging function capable of achieving the maximum in the signal processing capability of a portable terminal by preventing the functional restriction of the portable terminal by effectively discharging exothermic heat from the portable terminal at the time of coupling the portable terminal whose function is restricted by heat generation to an external device, as well as a heat discharging system and a heat discharging method.

14 Claims, 16 Drawing Sheets

(56) References Cited

U.S. PATENT DOCUMENTS

| | | | |
|---|---|---|---|
| 7,401,644 B2 * | 7/2008 | Ziarnik et al. | 165/287 |
| 7,472,215 B1 * | 12/2008 | Mok et al. | 710/304 |
| 7,619,889 B2 * | 11/2009 | Yu et al. | 361/699 |
| 7,643,301 B1 * | 1/2010 | Yu et al. | 361/719 |
| 7,660,930 B2 * | 2/2010 | Mok et al. | 710/304 |
| 7,676,619 B2 * | 3/2010 | Mok et al. | 710/304 |
| 7,676,620 B2 * | 3/2010 | Mok et al. | 710/304 |
| 7,694,057 B2 * | 4/2010 | Mok et al. | 710/304 |
| 7,702,837 B2 * | 4/2010 | Mok et al. | 710/304 |
| 7,711,884 B2 * | 5/2010 | Mok et al. | 710/304 |
| 7,739,439 B2 * | 6/2010 | Mok et al. | 710/304 |
| 7,761,641 B2 * | 7/2010 | Mok et al. | 710/304 |
| 7,788,436 B2 * | 8/2010 | Mok et al. | 710/304 |
| 7,793,027 B2 * | 9/2010 | Mok et al. | 710/304 |
| 7,809,478 B2 * | 10/2010 | Siba et al. | 700/300 |
| 7,885,063 B2 * | 2/2011 | Yu et al. | 361/679.54 |
| 7,925,813 B2 * | 4/2011 | Mok et al. | 710/304 |
| 8,339,787 B2 * | 12/2012 | Tsai | 361/704 |
| 8,595,517 B2 * | 11/2013 | Riechel et al. | 713/300 |
| 2004/0130870 A1 | 7/2004 | Fleck et al. | |
| 2008/0036780 A1 * | 2/2008 | Liang et al. | 345/522 |
| 2009/0218087 A1 * | 9/2009 | Oshima | 165/185 |

* cited by examiner

HEAT PIPE DOCKING SYSTEM

REFERENCE TO RELATED APPLICATIONS

The Present Application claims priority to Japanese Patent Application No. 2009-215727, entitled "Heat Pipe Docking System," filed 17 Sep. 2009, and PCT/US2010/049303, filed Sep. 17, 2010, the contents of which are fully incorporated in their entirety herein.

BACKGROUND OF THE PRESENT APPLICATION

The present invention relates to electronic equipment having a heat discharging function constituted of the coupling between a portable terminal and an external device as well as a heat discharging system and a heat discharging method.

Electronic equipment, industrial equipment, automobiles and what not use elements and electronic parts that generate heat such as semiconductor integrated circuits, LED elements and power devices.

Elements and electronic parts have the problem that their operation cannot be guaranteed at a time when exothermic heat reaches a given temperature. Such an operation problem may have adverse influence on other parts and the housing, resulting in a decline in the performance of the electronic equipment and industrial equipment.

Nowadays, portable terminals such as portable phones and portable music reproducers can process signals such as moving pictures, voices, and data communication at high speeds by receiving and transmitting signals from and to inserted or built-in memory cards and memory devices at high speeds. As a result of such high-speed signal processing, elements mounted inside portable terminals such as semiconductor integrated circuits and power devices generate much heat.

Particularly, a portable terminal contains not only digital semiconductor integrated circuits for baseband processing used for processing digital signals but a large number of analogue semiconductor elements such as power amplifiers and high-frequency circuits as well. Accordingly, at a time when the portable terminal excessively uses signal processing capability and function, much heat is generated, resulting in adverse influence not only on the operation of the portable terminal but also on the user.

On the other hand, there is a need for miniaturization, reduction in thickness and weight, and high-density packaging of a portable terminal, and therefore, it has become difficult to discharge heat by the portable terminal alone. In addition, a portable terminal is held by a user unlike notebook-type PCs or TV sets that are put on the table or the like. Accordingly any excessive heat of a portable terminal may have adverse influence on the user. Under such circumstances, there are provided a portable terminal that restricts its function by detecting heat at a prescribed temperature or above and a portable terminal that restricts its function so that individual functions more than a prescribed volume cannot be simultaneously processed.

However, it is not preferable that functions of a portable terminal whose signal processing performance has been enhanced must be restricted due to the insufficiency of discharging heat.

Some technologies have been proposed that are capable of discharging heat through a docking station externally connected to electronic equipment in order to enhance the heat discharging capability of a portable terminal. Examples can be found in Japanese Unexamined Patent Application Nos. 2000-252656 (Reference 1); H11-259180 (Reference 2); and 2000-75960 (Reference 3).

However, References 1-3 have the following problems. First, each Reference aims at discharging heat by connecting a docking station to a notebook-type PC or installed-type electronic equipment for the purpose of extending its function. In other words, no Reference aims at discharging heat from electronic equipment such as a notebook-type PC and installed-type electronic equipment whose function is restricted by exothermic heat when the electronic equipment is used singly. The purpose of References 1-3 is to discharge increased heat as a result of adding functions by coupling electronic equipment to a docking station. In other words, no Reference aims at discharging heat from electronic equipment whose function is restricted by exothermic heat.

Although References 1-3 discloses the way of discharging heat generated by electronic equipment from a docking station coupled to the electronic equipment, it is not sufficient to cool the electronic equipment. If it is necessary to cool electronic equipment whose function is restricted by exothermic heat, none of the technologies disclosed in References 1-3 is capable of cooling the electronic equipment no matter how long it takes, leaving the problem of the functional restriction of the electronic equipment unsolved.

This problem was caused by the fact that no Reference took account of electronic equipment whose function is restricted by exothermic heat.

Furthermore, References 1-3 attach importance to electronic equipment and a docking station in the coupled state only rather than preferentially cooling the electronic equipment itself. In other words, the problem is that no Reference takes account of cooling for the purpose of reducing the functional restriction of electronic equipment.

Furthermore, References 1-3 disclose methods for discharging heat from docking stations by transferring heat conducted inside electronic equipment to docking stations because notebook-type PCs and installed-type electronic equipment are taken into consideration. However, heat discharge or heat conduction is frequently carried out on the surface of the housing or along the housing of a small and thin-type portable terminal. Accordingly, heat generated by a portable terminal cannot be sufficiently discharged if technologies disclosed in References 1-3 are applied to the purpose of discharging heat from a portable terminal. As a result, it is difficult to prevent the functional restriction of a portable terminal.

In view of the abovementioned problems, the purpose of the present invention is to provide electronic equipment having a heat discharging function capable of achieving the maximum in the signal processing capability of a portable terminal by reducing the functional restriction of the portable terminal by effectively discharging exothermic heat from the portable terminal at the time of coupling the portable terminal whose function is restricted by heat generation to an external device, as well as a heat discharging system and a heat discharging method.

SUMMARY OF THE PRESENT APPLICATION

In order to solve the abovementioned problems, the electronic equipment having a heat discharging function according to the present invention comprises a portable terminal, the portable terminal being restricted at a prescribed first temperature or above, and an external device couplable to the portable terminal, wherein the portable terminal comprises an exothermic body, a first heat conducting path for conducting heat from the exothermic body and a first heat discharging means for discharging heat conducted through the first heat conducting path, and wherein the external device comprises a second heat conducting path to be thermally connected to the first heat conducting path and a second heat discharging means for discharging heat conducted through the second heat conducting path.

The electronic equipment having a heat discharging function according to the present invention can discharge heat when it is coupled to an external device using both a heat discharging means of the portable terminal and a heat discharging means of the external device. As a result, the portable terminal can be cooled effectively and preferentially, resulting in a reduction in the functional restriction.

Particularly, an external device often has a function of exchanging electric signals with a portable terminal. Accordingly, the high-speed exchange of electric signals between the portable terminal and the external device can be achieved by preventing the functional restriction. In this case, any increase in costs can also be prevented because both the function of discharging heat from the portable terminal and the function of exchanging electric signals can be achieved by the external device alone.

Moreover, heat generated by a portable terminal can be immediately transferred to an external device by shutting down the heat discharging means of the portable terminal and discharging heat by the heat discharging means of the external device alone. As a result, the functional restriction of the electrical terminal can be prevented with more certainty.

As described above, the prevention of the functional restriction of a portable terminal caused by exothermic heat enables to assure its performance at a time when the portable terminal is coupled to an external device to perform high-speed signal processing.

The electronic equipment according to the first invention comprises a portable terminal, the portable terminal being restricted at a prescribed first temperature or above, and an external device couplable to the portable terminal, wherein the portable terminal comprises an exothermic body, a first heat conducting path for conducting heat from the exothermic body and a first heat discharging means for discharging heat conducted through the first heat conducting path, and wherein the external device comprises a second heat conducting path to be thermally connected to the first heat conducting path and a second heat discharging means for discharging heat conducted through the second heat conducting path.

This configuration enables electronic equipment to discharge heat generated by an exothermic body from an external device coupled to a portable terminal.

In addition to the first invention, the electronic equipment according to the second invention is characterized in that the first heat conducting path and the second heat conducting path are thermally connected to each other when the portable terminal is coupled to the external device and that exothermic heat from the exothermic body is discharged by the first heat discharging means and the second heat discharging means.

This configuration enables electronic equipment to discharge heat generated by an exothermic body from both a portable terminal and an external device, which leads to an increase in the heat discharging capability of the electronic equipment. As a result, a rise in the temperature of the portable terminal is suppressed, and therefore the portable terminal can achieve the maximum in its function and performance.

In addition to the first invention, the electronic equipment according to the third invention has the heat discharging function according to Claim 1, wherein the first heat conducting path and the second heat conducting path are thermally connected to each other and the thermal connection between the first heat conducting path and the first heat discharging means shut down or reduced when the portable terminal is coupled to the external device, and wherein exothermic heat from the exothermic body is discharged mainly by the second heat discharging means.

This configuration enables electronic equipment to immediately transfer heat generated by an exothermic body to an external device from a portable terminal, resulting in an immediate decline in the temperature of the portable terminal.

In addition to any one of the first invention through the third invention, the electronic equipment according to the fourth invention is characterized in that the electronic equipment further comprises a control means for controlling the heat discharging path of the exothermic body, wherein the control means maintains the thermal connection between the first heat conducting path and the first heat discharging means under a first condition and shut down or reduces the thermal connection between the first heat conducting path and the first heat discharging means under a second condition when the portable terminal is coupled to the external device.

In addition to the fourth invention, the electronic equipment according to the fifth invention is characterized in that the first condition is when the portable terminal is below a prescribed second temperature and the second condition when the portable terminal is equal to or greater than the second temperature, the second temperature being equal to or less than the first temperature.

These configurations enable electronic equipment to immediately transfer heat generated by an exothermic body to an external device from a portable terminal when the temperature of the portable terminal is so high that its function may likely be restricted on an early stage. As a result, the possibility of the functional restriction of the portable terminal can be reduced.

In addition to the fourth or fifth invention, the electronic equipment according to the sixth invention is characterized in that the control means detects the coupling between the portable terminal and the external device and outputs the detection result to a processing device of the portable terminal.

This configuration enables a portable terminal to recognize that its capability of discharging heat generated by an exothermic body has been enhanced. The enhanced heat discharging capability enables the portable terminal to not restrict its function.

In addition to any one of the first invention through the six invention, the electronic equipment according to the seventh invention is characterized in that the first heat conducting path and the second heat conducting path are thermally connected to each other through a heat conducting path of a connector, the connector receiving and transmitting signals between the portable terminal and the external device.

This configuration enables electronic equipment to easily transfer heat to an external device from a portable terminal.

In addition to any one of the first invention through the six invention, the electronic equipment according to the eighth invention is characterized in that the first heat conducting path is the housing of the portable terminal and the second heat conducting path the housing of the external device, the first heat conducting path and the second heat conducting path being thermally connected to each other when the portable terminal is coupled to the external device as a result of the housing of the portable terminal and the housing of the external device being thermally brought into contact with each other.

This configuration allows easily transferring heat generated by an exothermic body to an external device when a portable terminal is coupled to the external device as a result of the thermal connection of respective housings.

In addition to any one of the first invention through the eighth invention, the electronic equipment according to the ninth invention is characterized in that the portable terminal is a portable phone, a portable music reproducer, a portable mail terminal, a PDA, a digital camera, a digital video camera, a portable recorder, a smart phone, or a portable moving picture imaging device.

This configuration enables a portable terminal to achieve the maximum in its function and performance.

In addition to any one of the first invention through the ninth invention, the electronic equipment according to the tenth invention has the heat discharging function according to any one of Claims 1-9, wherein the external device is at least one of an extension unit for receiving and transmitting electric signals from and to the portable terminal and a charging unit for charging electric power to the portable terminal.

This configuration enables a portable terminal to be easily attached to an external device.

BRIEF DESCRIPTION OF THE FIGURES

The organization and manner of the structure and operation of the Present Application, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Application may be susceptible to embodiment in different forms, there is shown in the Figures, and will be described herein in detail, specific embodiments, with the understanding that the disclosure is to be considered an exemplification of the principles of the Present Application, and is not intended to limit the Present Application to that as illustrated.

In the illustrated embodiments, directional representations—i.e., up, down, left, right, front, rear and the like, used for explaining the structure and movement of the various elements of the Present Application, are relative. These representations are appropriate when the elements are in the position shown in the Figures. If the description of the position of the elements changes, however, it is assumed that these representations are to be changed accordingly.

Figure 1:
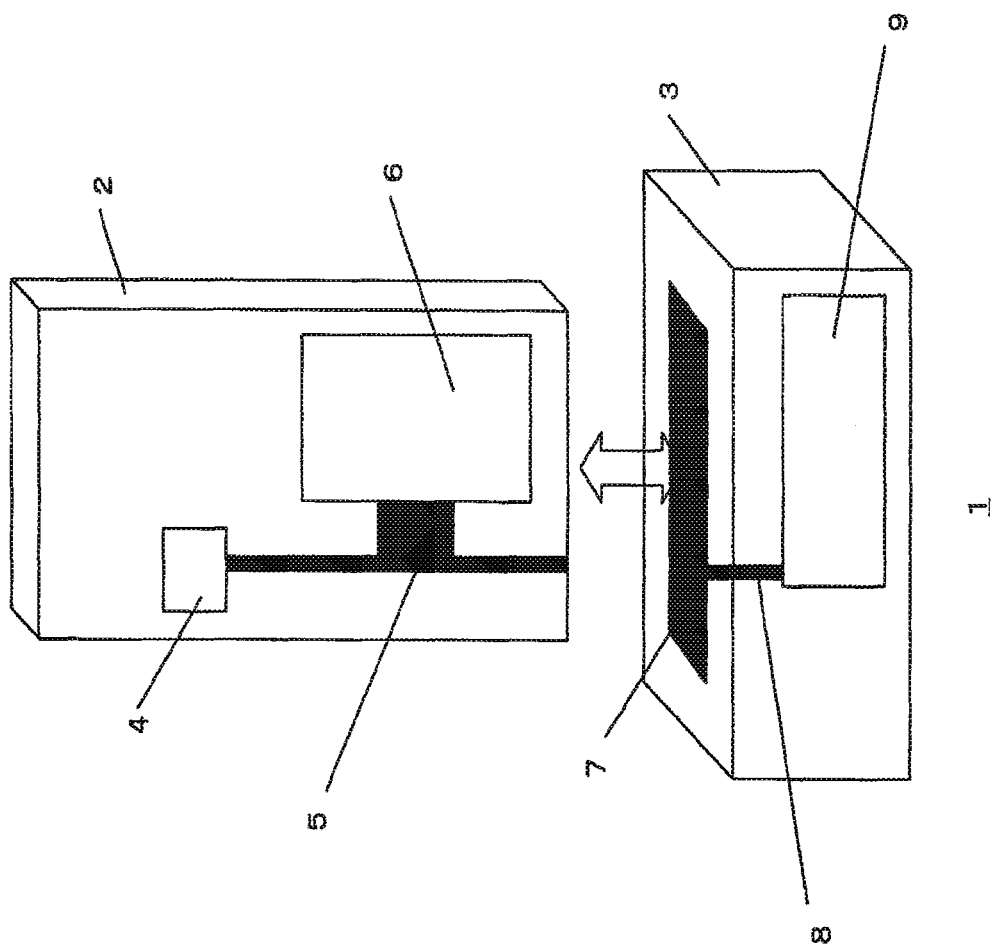
FIG. 1 is a perspective view of electronic equipment according to Embodiment 1 of the present invention.

FIG. 1 is a perspective view of the electronic equipment according to Embodiment 1 of the invention. As used herein, the term "electronic equipment" refers to a wide variety of equipment, instruments and devices operable by electric signals. The present invention incorporates a heat discharging processing system for achieving the maximum in the function and performance of various portable terminals into the above-mentioned electronic equipment constituted of a portable terminal and an external device couplable to the portable terminal.

FIG. 1 shows the electronic equipment 1 consisting of a portable terminal 2 and an external device 3. For convenience' sake, each of the portable terminal 2 and the external device 3 is described as transparent.

The electronic equipment 1 is provided with the portable terminal 2 whose function (performance) is restricted at a prescribed first temperature or above and the external device 3 couplable to the portable terminal 2. The portable terminal 2 is equipment such as a portable phone and a portable music reproducer used for specific purposes by users while carrying them outdoors or indoors. The external device 3 is provided with an attaching part 7 into which the portable terminal 2 is inserted. The portable terminal 2 and the external device 3 are coupled to each other by inserting the portable terminal 2 into the attaching part 7.

By coupling between the portable terminal 2 and the external device 3, a first heat conducting path 5 in the portable terminal 2 and a second heat conducting path 8 in the external device 3 are thermally connected to each other. As a result, heat generated from an exothermic body 4 in the portable terminal 2 is discharged by a first heat discharging means 6 in the portable terminal 2 and a second heat discharging means 9 in the external device 3. As the amount of heat discharged increases, exothermic heat generated from the exothermic body 4 is reduced, resulting in the suppression of a rise in temperature of the portable terminal 2. The suppression of a rise in temperature of the portable terminal 2 reduces the functional restriction of the portable terminal 2.

The portable terminal 2 and the external device 3 are coupled to each other at the time of charging the portable terminal 2, receiving electric signals from the portable terminal 2 or transmitting electric signals to the portable terminal 2.

By coupling between the portable terminal 2 and the external device 3, the portable terminal 2 and the external device 3 are electrically connected. As a result, electric signals and electric power can be received or transmitted.

Figure 2:
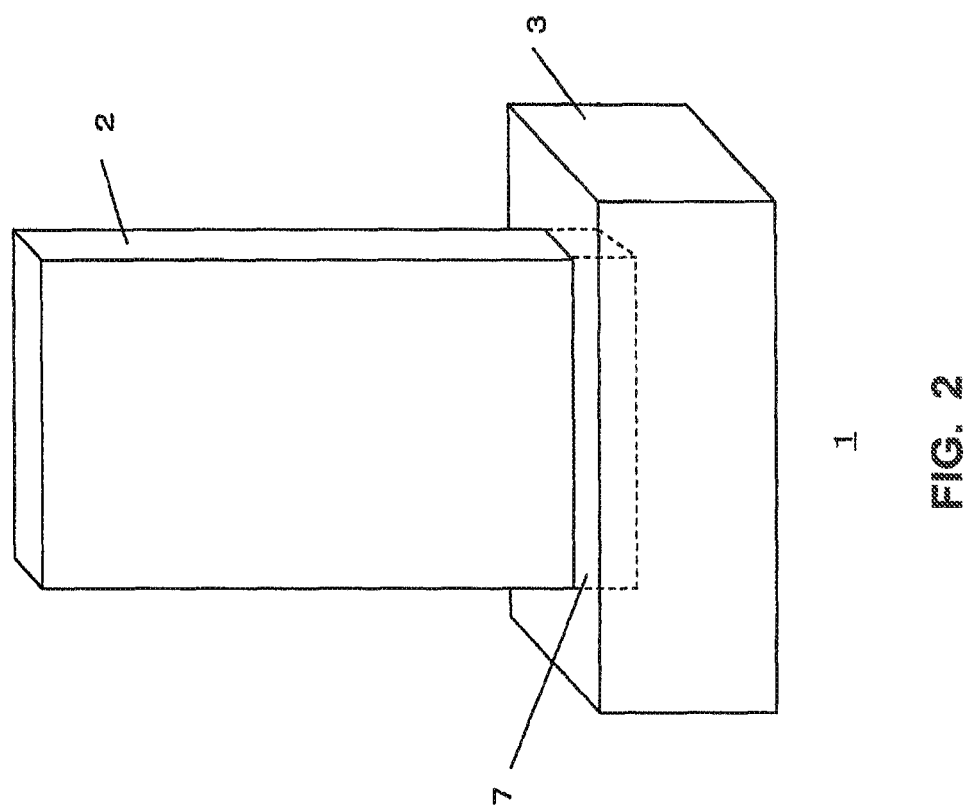
FIG. 2 is a perspective view of electronic equipment according to Embodiment 1 of the present invention.

The state in which the portable terminal 2 and the external device 3 are coupled to each other is shown in FIG. 2. FIG. 2 is a perspective view of electrical equipment according to Embodiment 1 of the invention.

FIG. 2 shows the state in which the portable terminal 2 is inserted into the attaching part 7 such that the portable terminal 2 and the external device 3 are coupled to each other. Unlike in FIG. 1, the inside of the portable terminal 2 and the external device 3 are not described as transparent in FIG. 2. By way of example, the coupling between the portable terminal 2 and the external device 3 shows the state in which the portable terminal 2 is being charged when the external device 3 is a charger and the state in which electric signals are being received and transmitted between the portable terminal 2 and the external device 3 when the external device 3 is an external memory device.

It goes without saying that the portable terminal 2 is separated from the external device 3 when it is carried by a user outdoors.

The portable terminal 2 contains a wide variety of electronic elements, electronic parts, power devices, electronic substrates and circuit substrates, and these electronic elements and electronic parts generate heat as a result of operation using electric signals. In other words, these electronic elements and electronic parts are exothermic bodies 4. The portable terminal 2 is provided with such exothermic bodies 4 inside.

Moreover, the portable terminal 2 is provided with the first heat conducting path 5 for conducting heat generated from the exothermic body 4 and the first heat discharging means 6 for discharging heat transferred through the first heat conducting path 5. The first heat conducting path 5 is formed of a plate member made of a metal, an alloy, a resin, a mineral or the like that have high thermal conductivity. The first heat conducting path 5 is a line formed inside and/or outside the portable terminal 2. Heat generated from the exothermic body 4 is conducted through this line. The first heat conducting path 5 conducts heat generated from the exothermic body 4 to the first heat discharging means 6 through this line.

The first heat discharging means 6 receives heat conducted from the first heat conducting path 5. Next, the first heat discharging means 6 discharges heat thus received to the outside. The first heat discharging means 6 is a radiating member (e.g., a radiator plate and a radiator sheet) provided inside the portable terminal 2 or the housing of the portable terminal 2, for example. Heat of the exothermic body 4 conducted through the first heat conducting path 5 is discharged by the first heat discharging means 6 including a radiating member and the housing.

When the portable terminal 2 is used alone, heat generated from the exothermic body 4 inside is discharged by means of the first heat conducting path 5 and the first heat discharging means 6. This heat discharging processing prevents the temperature of the portable terminal 2 from rising too high.

Nowadays, the performance of the portable terminal 2 is remarkably enhanced, and receiving and transmitting electric signals and signal processing are increasingly sophisticated and have enhanced functionality. If we achieve the maximum in the performance and function of the signal processing of the portable terminal 2, the amount of exothermic heat generated from the exothermic body 4 becomes so large that the heat generated from the exothermic body 4 may not be sufficiently discharged by means of the first heat conducting path 5 and the first heat discharging means 6 alone. The insufficient discharge of heat generated from the exothermic body 4 may cause malfunction in the portable terminal 2 or adversely influence a user who is holding the portable terminal 2. Unlike any installed electrical equipment, the portable terminal 2 is held by the hand of a user when used; therefore the user may feel uncomfortable in his/her hand when the temperature of the portable terminal 2 rises too high.

Accordingly, the portable terminal 2 is restricted in its function and performance at a prescribed first temperature or above.

Figure 3:
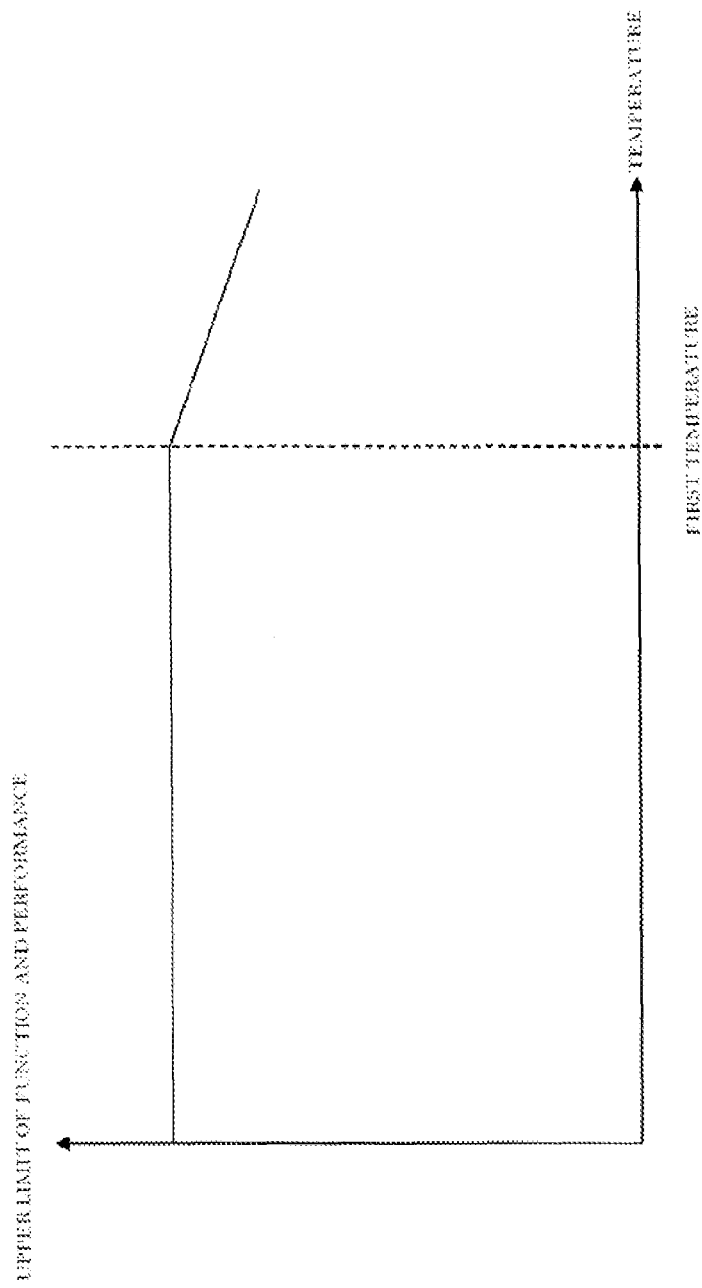
FIG. 3 is a graph explaining the restriction of the function and performance of a portable terminal according to Embodiment 1 of the present invention.

FIG. 3 is a graph explaining the restriction of the function and performance of a portable terminal according to Embodiment 1 of the present invention. The graph shows the temperature of the portable terminal 2 in the X-axis and the upper limit of the function and performance of the portable terminal 2 in the Y-axis. In the graph, a prescribed first temperature has been set.

As the graph in FIG. 3 shows clearly, the upper limit of the function and performance of the portable terminal 2 declines at a time when the temperature of the portable terminal 2 reaches the prescribed first temperature. This is because further temperature rise is prevented by restricting the upper limit of the function and performance.

Figure 4:
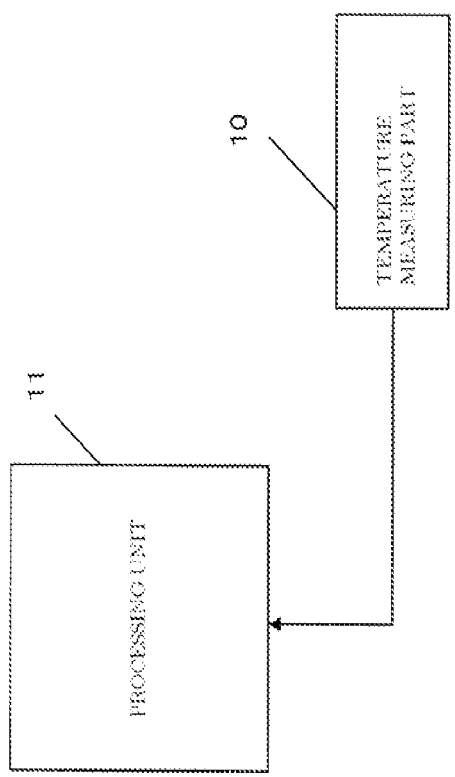
FIG. 4 is an internal block diagram of the portable terminal according to Embodiment 1 of the present invention.

As shown in FIG. 4, the restriction of the function and performance of the portable terminal 2 may be executed by a temperature measuring part 10 in the portable terminal 2 or executed programmably by a processing unit 11 in the portable terminal 2 based on temperature assumed from the executed functional volume.

Referring to FIG. 4, the portable terminal 2 is provided with the temperature measuring part 10 for measuring the temperature of the portable terminal 2 (which include various parameters capable of detecting temperature such as an internal temperature, an external surface temperature, a temperature at a prescribed position and an average temperature of the terminal) and the processing unit 11 for executing various functions necessary for the portable terminal 2. The processing unit 11 contains a central processing unit (referred hereinafter to as "CPU") and semiconductor integrated circuits for performing arithmetic processing.

The temperature measuring part 10 measures the temperature of the portable terminal 2 and informs the processing unit 11 of the measured result. Upon receiving the measured result, the processing unit 11 restricts the function and performance of the signal processing to be executed when the measured temperature is at the first temperature or above.

Alternatively, the temperature measuring part 10 measures the temperature of the portable terminal 2 to detect that the temperature of the portable terminal 2 is at the first temperature or above and informs the processing unit 11 of the detected result. Upon receiving the detected result that the temperature of the portable terminal 2 is at the first temperature or above, the processing unit 11 restricts the function and performance of the signal processing to be executed.

As a result of restricting the function and performance of the signal processing to be executed by the processing unit 11, the signal throughput of electronic parts, electronic elements and semiconductor integrated circuits is reduced, resulting in the suppression of a rise in temperature.

However, the heat discharging performance is often insufficient by the first heat discharging means 6 of the portable terminal 2 alone. When the processing unit 11 performs various types of signal processing, the temperature of the portable terminal 2 easily exceeds the first temperature, and the function and performance of the portable terminal 2 is frequently restricted. When the function and performance of the portable terminal 2 is restricted, the user feels inconvenient in using the portable terminal 2.

The electronic equipment 1 is capable of suppressing a rise in temperature of the portable terminal 2 by increasing the amount of heat discharged as a result of coupling between the portable terminal 2 and the external device 3.

Figure 5:
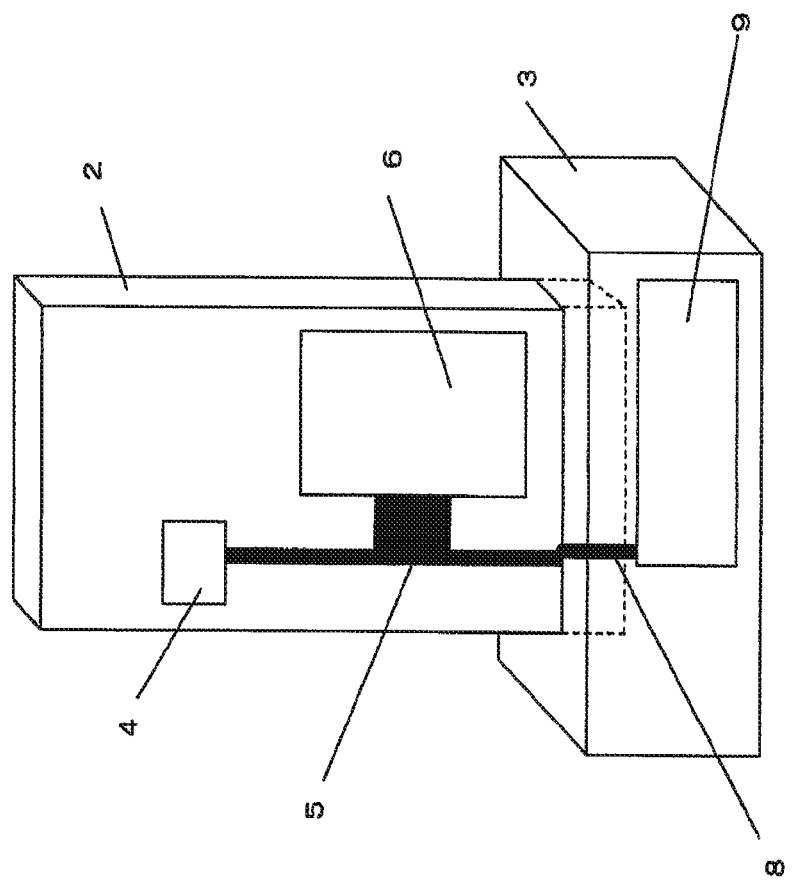
FIG. 5 is a perspective view of electronic equipment according to Embodiment 1 of the present invention.

FIG. 5 shows the state in which the portable terminal 2 and the external device 3 are coupled to each other in such a manner that the first heat conducting path 5 and a second heat conducting path 8 are thermally connected to each other. FIG. 5 is a perspective view of electronic equipment according to Embodiment 1 of the present invention.

The external device 3 is provided with the second heat conducting path 8 to be thermally connected to the first heat conducting path 5 at the time of being coupled to the portable terminal 2, and a second heat discharging means 9 for discharging heat conducted through the second heat conducting path 8.

When the portable terminal 2 is inserted into the attaching part 7 to be coupled to the external device 3, the first heat conducting path 5 and the second heat conducting path 8 are thermally connected.

When the first heat conducting path 5 and the second heat conducting path 8 are thermally connected, the external device 3 discharges heat conducted from the exothermic body 4 to the outside using the second heat discharging means 9. By coupling the external device 3 to the portable terminal 2, heat generated from the exothermic body 4 in the portable terminal 2 is discharged by the first heat discharging means 6 and the second heat discharging means 9. As a result, the heat discharging capability is enhanced and heat in the portable terminal 2 efficiently discharged.

As a result of heat generated from the exothermic body 4 in the portable terminal 2 being discharged by the first heat discharging means 6 and the second heat discharging means 9, a rise in temperature of the portable terminal 2 is suppressed, thus preventing the portable terminal 2 from reaching or exceeding the first temperature. Since the temperature of the portable terminal 2 is prevented from reaching or exceeding the first temperature, the restriction of the function and performance of the portable terminal 2 can be avoided and the usability of the portable terminal 2 enhanced. Particularly, the temperature of the portable terminal 2 tends to rise when the portable terminal 2 and the external device 3 are coupled to each other because a large number of electric signals are received and transmitted between the portable terminal 2 and the external device 3.

Nevertheless, the temperature of the portable terminal 2 in the electronic equipment 1 according to Embodiment 1 is prevented from rising too high because the heat discharging capability is also enhanced as a result of being coupled to the external device 3, whereby the signal processing based on a large number of electric signals, which is the purpose of being coupled to the external device 3, can be achieved.

The first heat discharging means 6 and the second heat discharging means 9 discharge heat generated from the exothermic body 4. However, heat discharged is not limited to that from the exothermic body 4. It is not excluded that the first heat discharging means 6 and the second heat discharging means 9 discharge heat generated from the portable terminal 2 and the external device 3.

The electronic equipment 1 is provided with the portable terminal 2 and the external device 3. The portable terminal 2 is used by a user while carrying it (mainly holding it by hand) outdoors and indoors. The portable terminal 2 includes electronic equipment having a signal processing function for users to execute specific purposes while carrying them such as a portable phone, a portable music reproducer, a portable mail terminal, a PDA, a digital camera, a digital video camera, a portable recorder, a smart phone, and a portable moving picture imaging device. However, the portable terminal 2 is not limited to the abovementioned examples but include various electronic devices that are popular now or will become popular in the future.

The portable terminal 2 is provided with analogue electronic parts and analog electronic elements such as a power device, an amplifier circuit, and a high-frequency circuit as well as general-purpose peripheral elements inside in addition to major electronic parts and electronic elements such as a digital signal processor (referred hereinafter to as "DSP"), a semiconductor integrated circuit for processing specific signals, and a memory device. These electronic parts and electronic elements are mounted on electronic substrates and circuit substrates and combined in various ways to execute specific signal processing.

Among these electronic parts and electronic elements, a CPU, a DSP, a semiconductor integrated circuit for processing specific signals and a power device generate much heat as their throughputs increase. In other words, these electronic parts and electronic elements (or circuit substrates on which they are mounted) such as a CPU, a DSP, a semiconductor integrated circuit for processing specific signals and a power device may be the exothermic bodies 4.

Moreover, the portable terminal 2 has the housing that stores these electronic substrates and circuit substrates and acts as an interface for a user. The housing has buttons and panels used by a user to operate the portable terminal 2.

The portable terminal 2 carries out various functions such as image compression, image expansion processing, sound compression, sound expansion processing, data communication processing and data memory processing. These functions are executed by a CPU, a DSP, a semiconductor integrated circuit for processing specific signals and what not in the portable terminal 2. In executing these functions, the CPU, the DSP, the semiconductor integrated circuit for processing specific signals and what not generate heat. When the exothermic heat increases excessively, the temperature of the portable terminal 2 rises, and the temperature rise may bring about malfunction and failures or causes a user to feel uncomfortable.

Accordingly, as shown in FIG. 2 and FIG. 3, the processing unit 11 restricts the signal processing-related function as a result of measuring temperature at the temperature measuring part 10 when the portable terminal 2 reaches or exceeds a prescribed first temperature.

The temperature of the portable terminal 2 is determined based on at least one parameter selected from the temperature of the exothermic body 4, the temperature of a circuit substrate on which the exothermic body 4 is mounted, the surface temperature of the housing of the portable terminal 2, and an average temperature value at multiple points of the portable terminal 2. The temperature measuring part 10 may measure each temperature corresponding to these parameters and output the results to the processing unit 11 or outputs the measured result of the temperature of the portable terminal 2 to the processing unit 11 based on each temperature corresponding to these parameters.

Furthermore, the temperature measuring part 10 may output the temperature of the portable terminal 2 to the processing unit 11 so that the processing unit 11 can judge whether the temperature of the portable terminal 2 is equal to or greater than the first temperature or not. Alternatively, the temperature measuring part 10 may judge whether the temperature of the portable terminal 2 is equal to or greater than the first temperature or not and then output the judgment result to the processing unit 11.

The first temperature may be set in an appropriate manner. As one standard, the first temperature is one at which a user can no longer hold the portable terminal 2 by hand.

The restriction of function and performance is exactly as described above.

As used herein, the term "restriction of function" includes the restriction of types and number of individual functions to be executed simultaneously and the preferential execution of a function having a light processing load rather than a function having a heavy processing load. More specifically, for example, suppose the processing of the following two functions are demanded simultaneously at a certain point of time: (1) a function of processing image compression; and (2) a function of writing data into a memory device. When the temperature measuring part 10 informs that the temperature of the portable terminal 2 has reached or exceeded the prescribed first temperature, the processing unit 11 stops (1) the function of processing image compression, which is a heavy processing load, and preferentially executes (2) the function of writing data into a memory device, which is a light processing load. The temperature rise of the portable terminal 2 is suppressed by such restriction of function. The suppression of a rise in temperature enables the processing unit 11 to execute various functions again.

Moreover, the term "restriction of function" also includes the restriction of throughput per unit time or the restriction of the maximum throughput in specific signal processing such as data communication and image processing. More specifically, suppose the portable terminal 2 has the maximum capability of executing data communication up to 100 Mbytes per second. When the temperature measuring part 10 informs that the temperature of the portable terminal 2 has reached or exceeded the prescribed first temperature, the processing unit 11 restricts the maximum value of data communication to 32 Mbytes per second. Thus, the processing unit 11 restricts the signal processing in such a manner that the maximum capability cannot be achieved when the temperature of the portable terminal 2 has reached or exceeded the prescribed first temperature, whereby the temperature rise of the portable terminal 2 can be suppressed. The suppression of a rise in temperature enables the processing unit 11 to restore the maximum capability in the processing.

Thus, the portable terminal 2 is characterized by restricting its function and performance when its temperature reaches or exceeds the first temperature.

The portable terminal 2 is inserted into the external device 3 to be coupled thereto. As a result, the portable terminal 2 is electrically connected to the external device 3 so that it can receive/transmit electric signals and charge/discharge electric power.

Moreover, the portable terminal 2 is provided with the first heat conducting path 5 for conducting heat generated from the exothermic body 4 and the first heat discharging means 6 for discharging heat thus conducted. In this configuration, the portable terminal 2 can discharge heat generated from the exothermic body 4.

The first heat conducting path 5 conducts heat generated from the exothermic body 4 to the first heat discharging means 6. The first heat conducting path 5 is thermally brought into contact with the exothermic body 4 to conduct heat generated from the exothermic body 4.

The first heat conducting path 5 is formed of a plate member made of a metal, an alloy, a resin, a mineral or the like that has high thermal conductivity. Preferable materials include metals having high thermal conductivity such as copper, aluminum, tungsten and titanium, heat-resistant resins, minerals such as graphite and diamond, and composite materials made of the abovementioned materials. Lines formed of such materials are mounted inside the portable terminal 2 to constitute the first heat conducting path 5. Alternatively, lines formed of such materials are mounted or coated on electronic substrates, circuit substrates, inside surface of the housing, or outside surface of the housing to constitute the first heat conducting path 5.

It is also preferred to use a heat pipe, where a cooling medium is sealed inside and heat transferred by means of vaporization and condensation of the cooling medium. When a heat pipe is used as the first heat conducting path 5, it is desirable to specifically constitute this heat pipe such that heat can be transferred in a single direction.

Moreover, the first heat conducting path 5 may be constituted of a material different from one constituting circuit substrates and electronic substrates in the portable terminal 2 or constituted of part of the circuit substrates and electronic substrates. Alternatively, the first heat conducting path 5 may be constituted of the inside or outside of the housing of the portable terminal 2. Thus, the utilization of members and elements originally provided for the portable terminal 2 as the first heat conducting path 5 help avoid blocking the miniaturization and reduction in thickness of the portable terminal 2.

The first heat conducting path 5 conducts heat generated from the exothermic body 4 not only to the first heat discharging means 6 but also to the second heat conducting path 8 in the external device 3. In other words, the first heat conducting path 5 and the second heat conducting path 8 can be thermally connected to each other at a time when the portable terminal 2 and the external device 3 are coupled to each other at the attaching part 7. In order to realize this thermal connection, it is preferred that the first heat conducting path 5 has reached the edge portion of the portable terminal 2. If it has not reached the edge portion, it is desirable that the first heat conducting path 5 has reached to a point where it can be thermally brought into contact with the inside of the attaching part 7.

Thus, it is preferred that the first heat conducting path 5 has paths for conducting heat to both the first heat discharging means 6 and the second heat conducting path 8. For example, as shown in FIG. 1, the first heat conducting path 5 may be branched off to be connected to the first heat discharging means 6 and the second heat conducting path 8. Alternatively, the first heat conducting path 5 may be extended to the second heat conducting path 8 from the exothermic body 4 and the first heat discharging means 6 disposed in the middle of the first heat conducting path 5.

As described above, the first heat conducting path 5 conducts heat generated from the exothermic body 4 to the first heat discharging means 6 and the second heat conducting path 8.

The first heat discharging means 6 discharges heat generated from the exothermic body 4 and conducted through the first heat conducting path 5. In other words, the first heat discharging means 6 discharges heat generated from the exothermic body 4 from the portable terminal 2.

The first heat discharging means 6 may be constituted of a radiator plate, a radiator sheet, a liquid cooling jacket, a heat sink, a heat pipe, a fan and a discharge port singly or in combinations thereof. With such a member or a combination of those members that can discharge heat (i.e., dissipate heat), the first heat discharging means 6 can discharge heat conducted through the first heat conducting path 5 via the housing or a discharge port. It is preferred that a heat sink, a heat pipe and a fan be a thin or small type.

In the case of a portable phone, a smart phone, a portable mail terminal, or a portable music reproducer, the portable terminal 2 is very thin. In such a thin type, the portable terminal 2 does not have any spatial room for mounting a heat sink or a heat pipe; therefore a radiator plate or a radiator sheet is often used for the first heat discharging means 6. For example, a radiator sheet disposed over a wide area of the housing of the portable terminal 2 may be preferably used as the first heat discharging means 6. A radiator sheet may be a carbon sheet or a metal sheet, for example. Heat conducted through the first heat conducting path 5 is diffused by the radiator sheet, transferred to the housing and then discharged to the outside from the external portion of the housing.

Alternatively, the first heat discharging means 6 may be provided with a radiator sheet and a heat sink provided on the housing for dissipating heat transferred to the housing from the radiator sheet. Or, the first heat discharging means 6 may be a combination of a radiator sheet and a liquid cooling jacket.

When the first heat discharging means 6 is a radiator sheet and the first heat conducting path 5 a line formed of a metal, a resin or the like, the first heat conducting path 5 and the first heat discharging means 6 may be integrally formed by optimizing the shape of the sheet made of a metal, a resin, or the like. The integral forming enables to decrease thermal resistance at the connecting section between the first heat conducting path 5 and the first heat discharging means 6, thereby achieving efficient heat conduction.

It goes without saying that the first heat conducting path 5 and the first heat discharging means 6 may be formed separately and the first heat conducting path 5 formed of a line and the first heat discharging means 6 formed of a radiator sheet be physically (or via another member having thermal conductivity) brought into contact with each other so that the first heat conducting path 5 and the first heat discharging means 6 can thermally come into contact with each other. Alternatively, the first heat conducting path 5 and the first heat discharging means 6 may be thermally connected to each other via a thermal interface material. The separate configuration of the first heat conducting path 5 and the first heat discharging means 6 allows for a degree of freedom in terms of respective shape and installation site of the first heat conducting path 5 and the first heat discharging means 6.

As described below, the thermal contact between the first heat conducting path 5 and the first heat discharging means 6 may be shut down. In order for such a case to be applied, it may be desirable that the first heat conducting path 5 and the first heat discharging means 6 be formed of separate members.

The first heat discharging means 6 may be made of a metal, an alloy, a resin, or another material like the first heat conducting path 5. In the case of a metal, it is proper to use a material having high thermal conductivity such as copper, aluminum, tungsten or titanium.

In the present invention, the first heat conducting path 5 and the first heat discharging means 6 are described as separate elements. However, it is not necessary to strictly separate them. The first heat conducting path 5 and the first heat discharging means 6 may physically be the same member. Moreover, the first heat conducting path 5 may not only conduct heat generated from the exothermic body 4 but also discharge it and the first heat discharging means 6 not only discharge heat but also conduct it. In other words, both the first heat conducting path 5 and the first heat discharging means 6 may have both functions of heat conduction and heat discharge.

The external device 3 is equipment or an device couplable to the portable terminal 2 and has the attaching part 7 into which the portable terminal 2 is inserted. The attaching part 7 contains a slot provided for the external device 3.

It goes without saying that the attaching part 7 is not an absolutely necessary constituent element. It is sufficient that the external device 3 has a structure capable of electrically or thermally connecting the external device 3 to the portable terminal 2.

The external device 3 is at least one of an extension unit for receiving and transmitting electric signals from and to the portable terminal 2 and a charging unit for charging or supplying electric power to the portable terminal 2.

The external device 3 may be a single extension unit, an extension unit having a charging or supplying function or a charger having a function of receiving and transmitting electric signals.

The extension unit may be relaying equipment for retrieving data in order to download images and sound data stored in a memory device of the portable terminal 2 (e.g., a semiconductor memory, a hard disk drive, a flash memory, a memory card, and a memory stick) to a personal computer and server equipment or relaying equipment for transferring data stored in a personal computer and server equipment to a memory device or a processor of the portable terminal 2. When the external device 3 is an extension unit for transferring data between the portable terminal 2 and another device, the portable terminal 2 and the external device 3 are electrically connected to each other in order to receive and transmit a large amount of electric signals.

It goes without saying that the external device 3 may have a memory device for storing data, and receive and transmit electric signals from and to the portable terminal 2.

Furthermore, the external device 3 may be a device for extending the function of the portable terminal 2. For example, when the portable terminal 2 is a portable music reproducer or a digital camera, the external device 3 may be a device having a speaker and an image displaying screen or a device having a supplementary processing function for increasing the operational speed of the portable terminal 2.

Furthermore, the external device 3 may be a device for charging or supplying electric power to the portable terminal 2. For example, when the portable terminal 2 processes a large amount of data, the external device 3 may supplement electric power shortage of electronic parts and electronic elements inside the portable terminal 2.

The portable terminal 2 needs to achieve high functionality and performance by receiving and transmitting such a large amount of electric signals. As a result, the temperature of electronic parts and electronic elements including the exothermic body 4 rises, resulting in a rise in temperature of the portable terminal 2. At a time when the temperature of the portable terminal 2 reaches or exceeds the prescribed first temperature, the portable terminal 2 is restricted in its function and performance, resulting in preventing a large amount of electric signals from being received or transmitted. In order to cope with such a problem, the external device 3 is provided with the second heat discharging path 8 capable of being thermally connected to the first heat conducting path 5 and the second heat discharging means 9 for discharging heat conducted through the second heat discharging path 8. At the time of being coupled to the portable terminal 2, the external device 3 enables the second heat discharging path 8 to be thermally connected to the first heat conducting path 5.

The second heat conducting path 8 is formed on the inside or outside surface of the external device 3 to conduct heat transferred from the first heat conducting path 5.

The second heat conducting path 8 is formed of a plate member made of metals, alloys, resins, minerals or the like that have high thermal conductivity. Preferable materials include metals having high thermal conductivity such as copper, aluminum, tungsten and titanium, heat-resistant resins, minerals such as graphite and diamond, and composite materials made of the abovementioned materials. Lines formed of such materials are mounted inside the portable terminal 2 to constitute the second heat conducting path 8. Alternatively, lines formed of such materials are mounted or coated on electronic substrates, circuit substrates, inside surface of the housing, or outside surface of the housing to constitute the second heat conducting path 8.

It is also preferred to use a heat pipe, where a cooling medium is sealed inside and heat transferred by means of vaporization and condensation of the cooling medium. When a heat pipe is used as the second heat conducting path 8, it is desirable to specifically constitute this heat pipe such that heat can be transferred in a single direction.

Moreover, the second heat conducting path 8 may be constituted of a material different from one constituting circuit substrates and electronic substrates in the external device 3 or constituted of part of the circuit substrates and electronic substrates. Alternatively, the second heat conducting path 8 may be constituted of the inside or outside of the housing of the external device 3. Thus, the utilization of members and elements originally provided for the external device 3 as second heat conducting path 8 help avoid blocking the miniaturization and reduction in thickness of the external device 3.

The second heat conducting path 8 conducts heat to the second heat discharging means 9. The heat transferred to the second heat discharging means 9 is discharged by the second heat discharging means 9.

The second heat conducting path 8 is thermally connected to the first heat conducting path 5 when the portable terminal 2 and the external device 3 are coupled to each other. For the purpose of this thermal connection, the first heat conducting path 5 reaches the end portion of the portable terminal 2 and the second heat conducting path 8 the end portion of the attaching part 7, whereby the end portion of the first heat conducting path 5 and the end portion of the second heat conducting path 8 are brought into contact with each other.

Alternatively, the first heat conducting path 5 is the housing of the portable terminal 2 and the second heat conducting path 8 the housing of the external device 3. Respective housings are brought into contact with each other by fitting the portable terminal 2 into the slot-shaped attaching part 7 so that the first heat conducting path 5 and the second heat conducting path 8 can be thermally connected.

Figure 6:
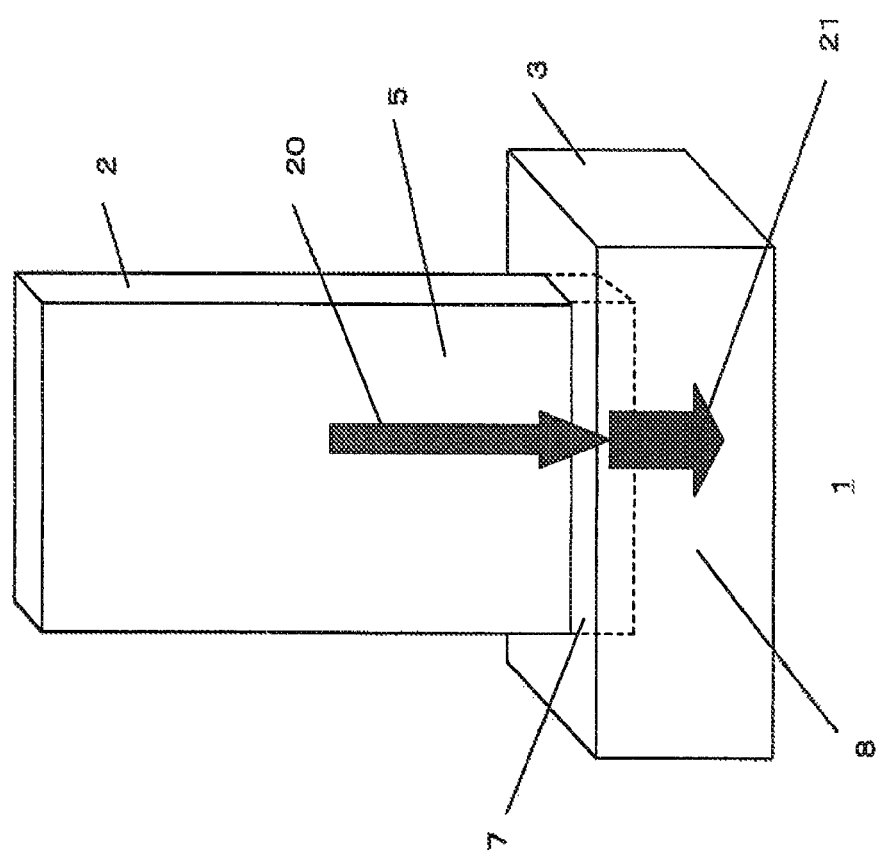
FIG. 6 is a perspective view of electronic equipment according to Embodiment 1 of the present invention.

FIG. 6 shows the first heat conducting path 5 that is the housing of the portable terminal 2 (the first heat conducting path 5 is formed using the entire housing or part thereof) and the second heat conducting path 8 that is the housing of the external device 3 (the second heat conducting path 8 is formed using the entire housing or part thereof).

Since the portable terminal 2 is fitted into the attaching part 7, the housing of the portable terminal 2 and the housing of the external device 3 are brought into contact with each other. As a result of the contact, the first heat conducting path 5 and the second heat conducting path 8 are thermally connected. An arrow 20 in FIG. 6 shows heat transferred through the first heat conducting path 5, and an arrow 21, which is connected to the arrow 20, shows heat transferred through the second heat conducting path 8. Thus, heat may be conducted to the external device 3 from the portable terminal 2 by bringing both housings into contact with each other.

The second heat conducting path 8 conducts heat to the second heat discharging means 9, and the second heat discharging means 9 discharges heat thus conducted. In the case of heat conduction by bringing both housings into contact with each other as shown in FIG. 6, it is most likely that heat conduction and heat discharge are carried out simultaneously.

In other words, the housing of the portable terminal 2 constitutes the first heat conducting path 5 and the first heat discharging means 6, and heat generated from the exothermic body 4 is conducted through the housing of the portable terminal 2 and discharged to the outside. The remaining heat that is not discharged to the outside is conducted to the housing of the external device 3, which is the second heat conducting path 8, from the housing of the portable terminal 2, which is the first heat conducting path 5. Heat transferred to the housing of the external device 3 is conducted through the housing of the external device 3 and discharged to the outside. Simply put, the housing of the external device 3 constitutes the second heat discharging means 9. It goes without saying that the external device 3 may be provided with a heat sink, a fan or the like to discharge heat more actively.

Thus, the second heat conducting path 8 is thermally connectible to the first heat conducting path 5 and conducts heat to the second heat discharging means 9.

Alternatively, the first heat conducting path 5 and the second heat conducting path 8 may be thermally connected to each other via a connector through which the portable terminal 2 and the external device 3 receive and transmit electric signals.

Figure 7:
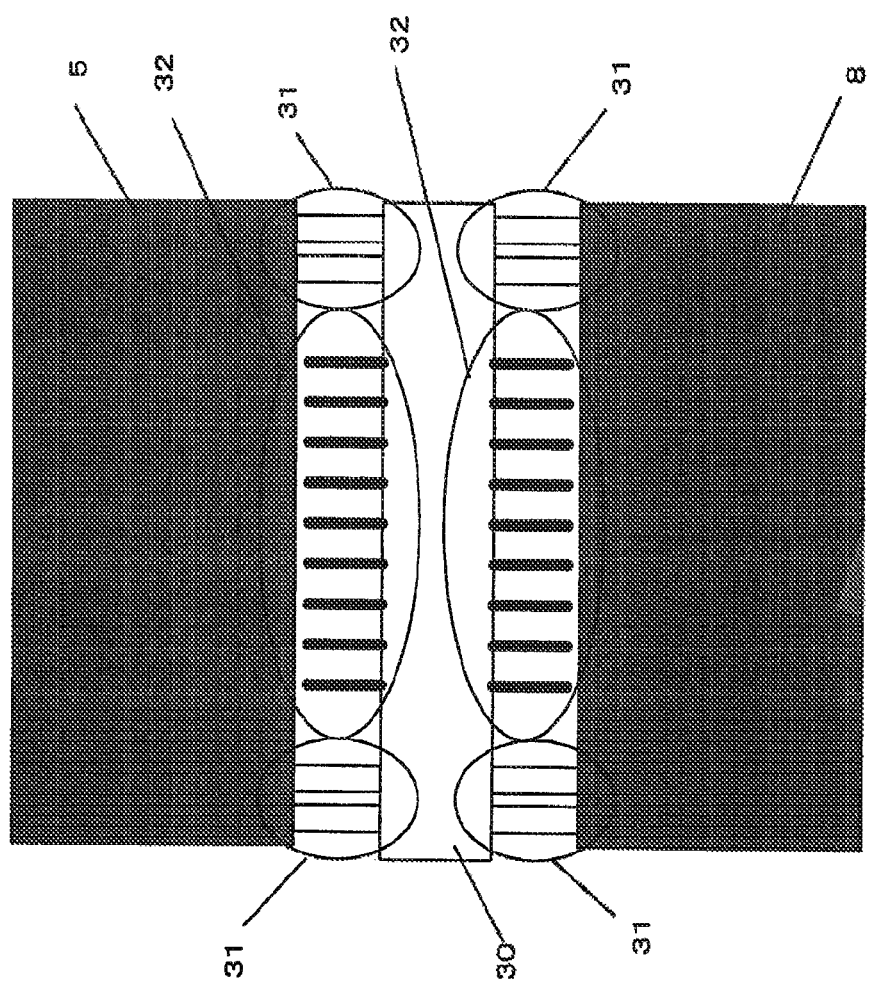
FIG. 7 is an explanatory view showing the thermal connection between a first heat conducting path and a second conducting path according to Embodiment 1 of the present invention.

FIG. 7 is an explanatory view showing the thermal connection between the first heat conducting path and the second conducting path according to Embodiment 1 of the present invention. FIG. 7 shows a connector 30 that is connected for receiving and transmitting electric signals at a time when the portable terminal 2 and the external device 3 are coupled to each other.

The connector 30 may be provided for either the portable terminal 2 or the attaching part 7 or an independent member to be disposed at a time when the portable terminal 2 is attached to the attaching part 7. The connector 30 is positioned in between the first heat conducting path 5 of the portable terminal 2 and the second heat conducting path 8 of the external device 3. To put another way, the connector 30 is a member used for receiving and transmitting electric signals between the portable terminal 2 and the external device 3, and therefore the first heat conducting path 5 and the second heat conducting path 8 may be disposed in accordance with the position of the connector 30.

The connector 30 is provided with electric pins 32 used for receiving and transmitting electric signals between the portable terminal 2 and the external device 3 and heat conducting pins 31 used for thermally connecting the first heat conducting path 5 to the second heat conducting path 8.

The heat conducting pins 31 thermally connects the first heat conducting path 5 to the second heat conducting path 8. By way of example, when the first heat conducting path 5 and the second heat conducting path 8 are plate members made of a metal or a resin, the heat conducting pins 31 are inserted into holes provided on the edge faces of those plate members. As a result of the insertion of the heat conducting pins 31, the first heat conducting path 5 and the second heat conducting path 8 are thermally connected.

Alternatively, when the first heat conducting path 5 and the second heat conducting path 8 are flat sheets or lines, the heat conducting pins 31 are alternate plate-shaped, and the plate-shaped heat conducting pins 31 sandwich the first heat conducting path 5 and the second heat conducting path 8, whereby the heat conducting path 5 and the second heat conducting path 8 are thermally connected.

Thus, the heat conducting pins 31 are used not only for receiving and transmitting electric signals but also for thermally connecting the first heat conducting path 5 to the second heat conducting path 8.

Suppose the first heat conducting path 5 is a member made of a metal or a resin and reaches the edge portion of the portable terminal 2, and the second heat conducting path 8 is a member made of a metal or a resin and reaches a portion that comes into contact with the portable terminal 2. In this case, the member forming the first heat conducting path 5 and the member forming the second heat conducting path 8 may be physically brought into contact with each other at the time of coupling between the portable terminal 2 and the external device 3, thus achieving the thermal connection.

Thus, the coupling of portable terminal 2 and the external device 3 enables to thermally connect the first heat conducting path 5 to the second heat conducting path 8 and conduct heat generated from the exothermic body 4 (i.e., heat in the portable terminal 2) to the external device 3.

The second heat discharging means 9 discharge heat conducted from the second heat conducting path 8. The second heat discharging means 9 is provided inside or outside the external device 3 and discharges heat to the outside from the external device 3.

The second heat discharging means 9 receives heat conducted through the second heat conducting path 8 and discharges it. The second heat discharging means 9 and the second heat conducting path 8 may be separate members or an integral member. Accordingly, respective functions of the second heat discharging means 9 and the second heat conducting path 8 may not be strictly distinguished between heat conduction and heat discharge. Each function may be a mixture of heat conduction and heat discharge. In other words, the second heat conducting path 8 may discharge heat to the outside while conducting heat, and the second heat discharging means 9 discharges heat while conducting heat to the housing of the external device. The heat transferred to the housing is discharged to the outside by the housing.

The second heat discharging means 9 may be at least part of the housing of the external device 3, a radiator plate or a radiator sheet provided on the inside or outside surface of the external device 3, a heat sink or a heat pipe, or a member formed by combining a radiator plate, a radiator sheet, a heat sink and a heat pipe with a cooling fan and a liquid cooling jacket. Since it is installed, the second heat discharging means 9 may have various configurations and sizes unlike the portable terminal 2. Accordingly, the heat discharging capability of the second heat discharging means 9 can be larger than that of the first heat discharging means 6. Various examples of the second heat discharging means 9 are described below.

In the case that heat is conducted to the surface of the housing of the external device 3 from the second heat conducting path 8, heat is discharged to the outside from at least part of the housing of the external device 3. In other words, the second heat discharging means 9 is constituted of at least part of the housing of the external device 3. The second heat conducting path 8 is provided inside the external device 3. The second heat conducting path 8 conducts heat to the second heat discharging means 9 from the inside of the external device 3. Alternatively, the second heat conducting path 8 is the housing of the external device 3, and heat conducted through the housing, which is the second heat conducting path 8, is discharged from the housing, which is the second heat discharging means 9.

In the case that the second heat discharging means 9 is constituted of at least part of the housing of the external device 3, the housing may further be provided with a heat sink, a cooling fan for sending wind to the housing, or a liquid cooling jacket for cooling the housing with a cooling medium. The second heat discharging means 9 may comprise such a heat sink, a cooling fan and a liquid cooling jacket as part of its constituent elements.

Alternatively, the second heat discharging means 9 may be a heat sink provided for the external device 3. The heat sink is provided inside the housing and discharges heat to the outside. Or, the heat sink is exposed from the external device 3, and the exposed heat sink discharges heat to the outside. In the case that the second heat discharging means 9 is a heat sink, the second heat conducting path 8 conducts heat to the heat sink.

The second heat discharging means 9 may be a liquid cooling jacket provided inside the external device 3. In this case, a pump for rotating a cooling medium is installed at a place where the liquid cooling jacket comes into contact with the second heat conducting path 8. Heat conducted through the second heat conducting path 8 is discharged to the outside by the cooling medium circulated by the pump.

The second heat discharging means 9 may be a radiator plate or a radiator sheet installed inside the external device 3. Such a radiator plate or radiator sheet discharges heat in the space inside the housing, and the discharged heat is dissipated to the outside. The radiator plate or radiator sheet may be provided with a heat sink and a cooling fan. The second heat discharging means 9 may be a combination of multiple members.

The external device that is less restricted in shape and size than the portable terminal 2 can be provided with the second heat discharging means 9 using various members or in combinations of various members. Such types of second heat discharging means 9 have relatively higher heat discharging capability than the first heat discharging means 6 and can efficiently discharge heat transferred through the second heat conducting path 8.

The second heat discharging means 9 may discharge not only heat conducted from the exothermic body 4 and the portable terminal 2 but heat generated from the external device 3 as well.

Thus, the electronic equipment 1 according to Embodiment 1 thermally connects the first heat conducting path 5 of the portable terminal 2 to the second heat conducting path 8 of the external device 3 at a time when the portable terminal 2 and the external device 3 are coupled to each other. The second heat conducting path 8 thermally connected to the first heat conducting path 5 conducts heat conducted from the exothermic body 4 (the portable terminal 2) to the second heat discharging means 9. Furthermore, the heat from the exothermic body 4 is discharged from the first heat discharging means 6 of the portable terminal 2 and the second heat discharging means 9 of the external device 3.

As a result, the function and performance of the portable terminal 2 are hardly restricted because the temperature rise of the portable terminal 2 is suppressed such that the portable terminal 2 can hardly reach or exceed the prescribed first temperature. Particularly, a large amount of data is communicated when the portable terminal 2 is coupled to the external device 3. Under such circumstances, it is not preferred that the function and performance of the portable terminal 2 be restricted. The electronic equipment 1 according to Embodiment 1 can suppress the temperature rise of the portable terminal 2 and make use of the function and performance of the portable terminal 2 to the full even when a large amount of data is communicated by the coupling of the portable terminal 2 and the external device 3. The usability of such electronic equipment 1 is high among users.

The first temperature, which is the standard for restricting the function and performance of the portable terminal 2, may be preferably decided based on the heat discharging capability after the portable terminal 2 and the external device 3 are coupled to each other.

In Embodiment 1, we described the electronic equipment 1 above that was provided with the portable terminal 2 and the external device 3 and had a heat discharging function. Nevertheless, the present invention may be understood as a heat discharging system and a heat discharging method in electronic equipment. In this case, the subject of the present invention is a mechanism of discharging heat from the portable terminal by means of a heat conducting path connected between the portable terminal 2 and the external device 3 and heat discharging means for discharging heat from each of the portable terminal 2 and the external device 3.

The electronic equipment having a heat discharging function according to Embodiment 2 controls whether to use the first heat discharging means 6 at the time of discharging heat transferred from the exothermic body 4.

The electronic equipment according to Embodiment 1 discharges heat generated from the portable terminal 2 (especially heat generated from the exothermic body 4) by the first heat discharging means 6 and the second heat discharging means 9. In other words, heat generated in the portable terminal 2 is discharged by both the portable terminal 2 and the external device 3.

The heat discharging capability is high and more heat can be discharged integrally when heat generated from the portable terminal 2 is discharged from both the portable terminal 2 and the external device 3.

On the other hand, a user may want to transfer heat generated in the portable terminal 2 to another place as soon as possible. In this case, it is necessary to discharge heat generated in the portable terminal 2 from the external device 3 alone (i.e., not from the portable terminal 2). When the first heat discharging means 6 in the portable terminal 2 is connected to the first heat discharging path 5, which is connected to the exothermic body 4, heat from the exothermic body 4 is discharged from the first heat discharging means 6 as well. As a result, some heat remains in the portable terminal 2. Since heat from the exothermic body 4 conducted to the second heat conducting path 8 from the first heat conducting path 5 is discharged from the second heat discharging means 9, the heat from the exothermic body 4 can be discharged as the entire electronic equipment 1. However, it takes time to lower the temperature of the portable terminal 2 because some heat remains in the portable terminal 2 as a result of the heat discharge by the first heat discharging means 6.

Figure 8:
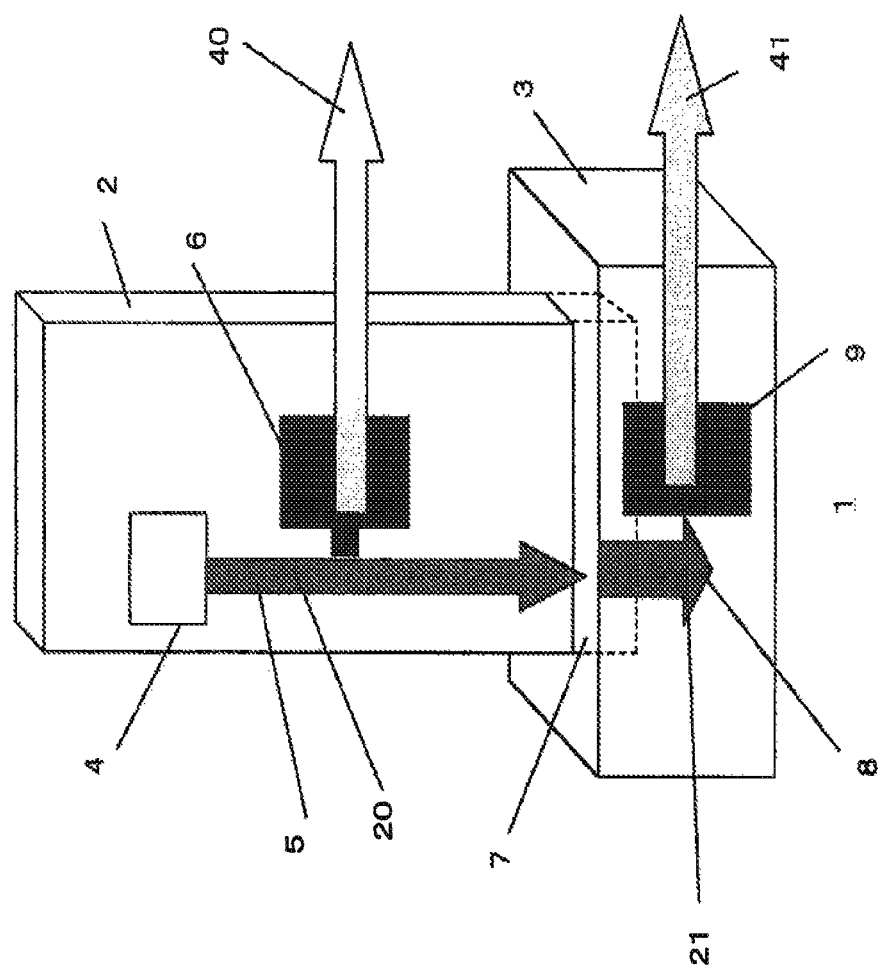
FIG. 8 is a schematic view explaining the heat discharging state in electric equipment according to Embodiment 2 of the present invention.

FIG. 8 shows the state in which the first heat discharging path 5 and the first heat discharging means 6 are thermally connected to discharge heat generated from the exothermic body 4 by the first heat discharging means 6 and the first heat conducting path 5 and the second heat conducting path 8 thermally connected to discharge heat from the exothermic body 4 by the second heat discharging means 9 as well. An arrow 20 in FIG. 8 shows the direction of heat conduction in the first heat conducting path 5 and an arrow 21 the direction of heat conduction in the second heat conducting path 8, which is connected to the first heat conducting path 5. In addition, an arrow 40 in FIG. 8 shows the direction of discharging heat from the exothermic body 4 by the first heat discharging means 6 and an arrow 41 the direction of discharging heat from the exothermic body 4 by the second heat discharging means 9.

As FIG. 8 shows clearly, the heat discharging capability is high because heat from the exothermic body 4 is discharged by both portable terminal 2 and the external device 3. However, some heat from the exothermic body 4 remains in the portable terminal 2.

As used herein, the heat discharging method as shown in FIG. 8 is defined as a first heat discharging path.

Figure 9:
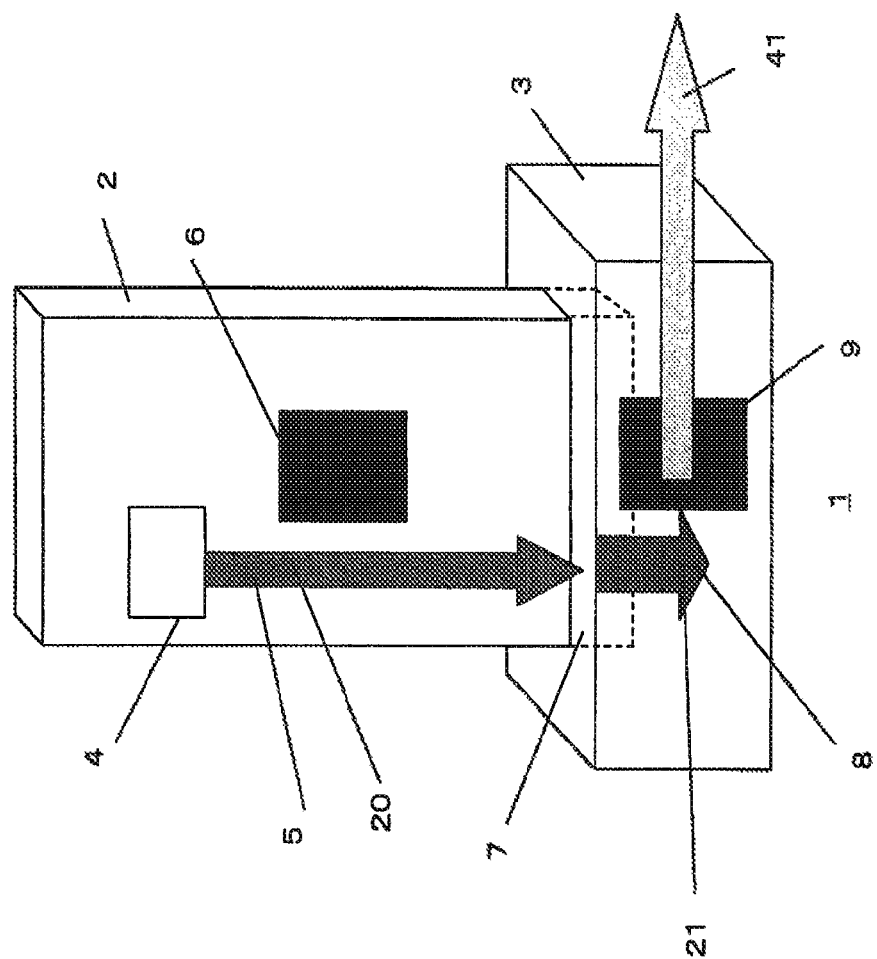
FIG. 9 is a schematic view explaining the heat discharging state in electric equipment according to Embodiment 2 of the present invention.

Unlike the case in FIG. 8, FIG. 9 shows the state in which the heat discharging capability of the first heat discharging means 6 is shut down or reduced and heat from the exothermic body 4 mainly discharged by the second heat discharging means 9. The heat discharging capability of the first heat discharging means 6 is shut down or reduced by closing the conducting path between the first heat conducting path 5 and the first heat discharging means 6 at the time of coupling between the portable terminal 2 and the external device 3, for example.

Heat from the exothermic body 4 is not conducted to the first heat discharging means 6 from the first heat conducting path 5 by shutting down or reducing the thermal connection between the first heat conducting path 5 and the first heat discharging means 6.

In consequence, as shown in FIG. 9, heat from the exothermic body 4 is discharged from the second heat discharging means 9 via the first heat conducting path 5 and the second heat conducting path 8. Of course it is not that the first heat discharging means 6 does not discharge heat from the exothermic body 4 at all when the thermal connection between the first heat discharging means 6 and the first heat conducting path 5 is shut down or reduced because some heat conducted to the first heat discharging means 6 remains undischarged.

As shown in FIG. 9, the heat discharging capability of the entire electronic equipment 1 declines when the first heat discharging means 6 scarcely discharges heat while the second heat discharging means 9 mainly carries this out. As a result, it takes time to cool the exothermic body 4.

On the other hand, heat from the exothermic body 4 hardly remains in the portable terminal 2 because the heat from the exothermic body 4 is not transferred to the first heat discharging means 6. In other words, heat from the exothermic body 4 passes through the portable terminal 2 quickly to be transferred to the external device 3 within a short period. Accordingly, heat can be transferred to the external device 3 from the portable terminal 2 at a high speed though it takes time to discharge heat from the external device 3.

As used herein, the heat discharging method as shown in FIG. 9 is defined as a second heat discharging path.

The portable terminal 2 is restricted in its function and performance at the prescribed first temperature or above.

When the first heat conducting path 5 and the first heat discharging means 6 are thermally connected and the first heat conducting path 5 and the second heat conducting path 8 also thermally connected, heat from the exothermic body 4 is discharged from both the first heat discharging means 6 and the second heat discharging means 9. Therefore, this method is suitable for lowering the heat of the entire electronic equipment 1. On the other hand, in the case of the second heat discharging path where the thermal connection of the first heat conducting path 5 and the first heat discharging means 6 is shut down or reduced, the heat of the portable terminal 2 is transferred to the external device quickly and the temperature of the portable terminal 2 lowered within a short period.

In the case of the second heat discharging path, the temperature decline of the portable terminal 2 tends to come to an end at an earlier point. This is because the heat discharging capability of the entire electronic equipment 1 is lower than that in the first heat discharging path.

Figure 10:
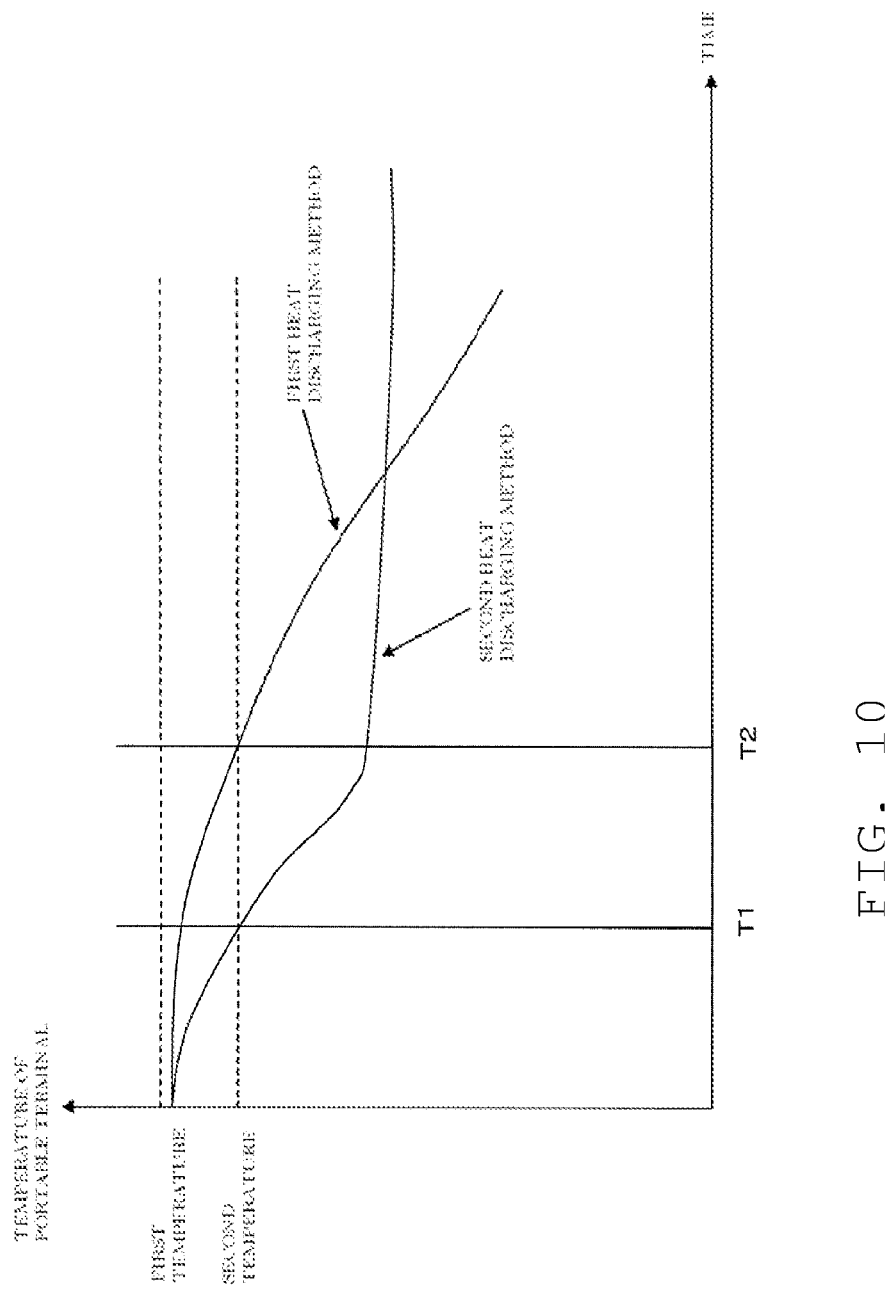
FIG. 10 is a graph showing temperature curves of a portable terminal according to Embodiment 2 of the present invention.

FIG. 10 shows temperature curves in the case of the first heat discharging path and the second heat discharging path. FIG. 10 is a graph showing temperature curves of the portable terminal according to Embodiment 2 of the present invention.

In the case of the first heat discharging path, as shown in FIG. 10, heat is slowly discharged by both heat discharging means of the first heat discharging means 6 and the second heat discharging means 9, and the temperature of the portable terminal 2 declines after a certain period of time.

On the other hand, in the case of the second heat discharging path, the temperature decline of the portable terminal 2 takes longer as a whole than that in the first heat discharging path even after a certain period of time because heat is discharged mainly by the second heat discharging means 9. Since heat is conducted to the external device 3 directly from the portable terminal 2, however, the temperature of the portable terminal 2 declines within a short period. Accordingly, based on the second temperature in the vicinity of the first temperature where the function of the portable terminal 2 is restricted, T1, which is the time required for reaching or surpassing the second temperature in the second heat discharging path, is shorter than T2, which is the time required for reaching or surpassing the second temperature in the first heat discharging path. After reaching the second temperature, the temperature decline of the portable terminal 2 is faster in the first heat discharging path, however.

The second temperature, which may be decided appropriately, is equal to or lower than the first temperature where the function and performance of the portable terminal 2 is restricted. In other words, the second temperature may be lower than the first temperature or equal to the first temperature. The second temperature is preferably in the vicinity of the first temperature. That the portable terminal 2 is at the second temperature or above means the state immediately before the functional restriction of the portable terminal 2 may occur. As shown in FIG. 10, the temperature of the portable terminal 2 that has exceeded the second temperature and is approaching the first temperature declines immediately in the second heat discharging path because heat in the portable terminal 2 is transferred to the external device 3 quickly. In other words, the temperature of the portable terminal 2 drops below the second temperature (i.e., the first temperature likewise) within a short period. As a result, the function of the portable terminal 2 is not restricted.

The second heat discharging path is superior at a time when the temperature of the portable terminal 2 is very high because heat in the portable terminal 2 needs to be transferred to the external device 3 as quickly as possible.

Figure 11:
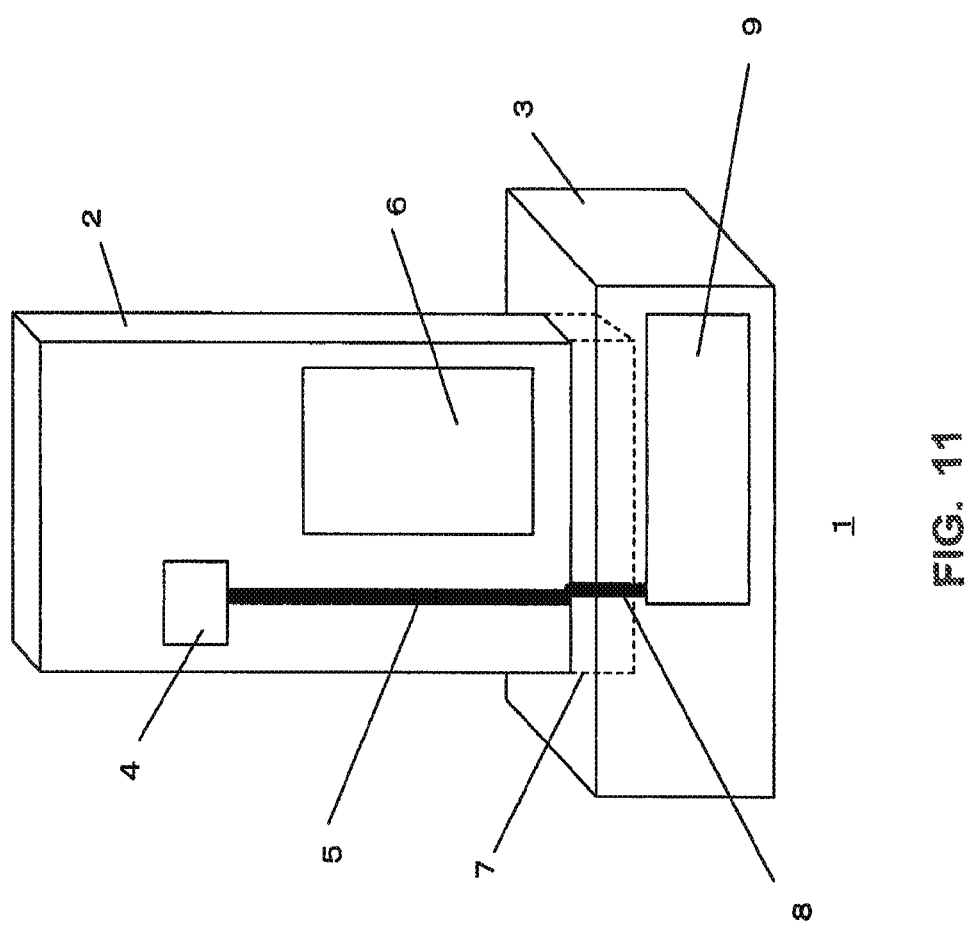
FIG. 11 is a perspective view of electronic equipment according to Embodiment 2 of the present invention.

In the electronic equipment 1 as shown in FIG. 11, the thermal connection between the first heat conducting path 5 and the first heat discharging means 6 in the portable terminal 2 is shut down or reduced.

The shutdown of the thermal connection between the first heat conducting path 5 and the first heat discharging means 6 can be achieved by turning off a thermal switch used for connecting the first heat conducting path 5 to the first heat discharging means 6 at the time of coupling between the portable terminal 2 and the external device 3.

Thus, the electronic equipment 1 shuts down or reduces the thermal connection between the first heat conducting path 5 and the first heat discharging means 6 depending on the temperature of the portable terminal 2 in order to transfer heat in the portable terminal 2 to the external device 3 as soon as possible.

Figure 12:
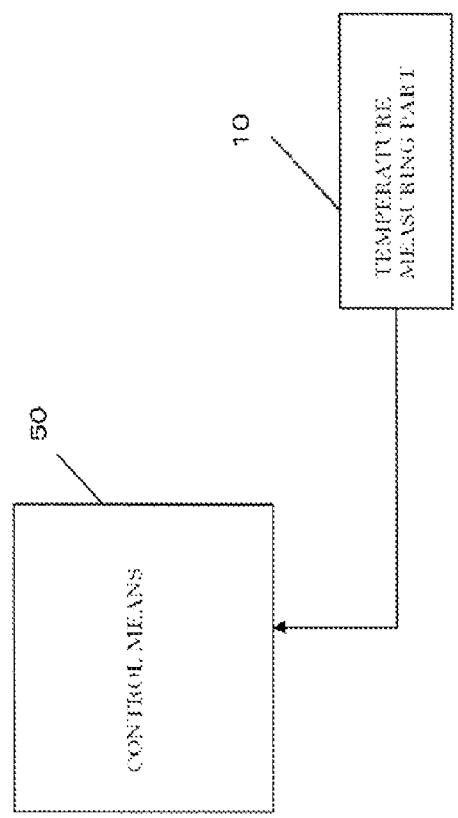
FIG. 12 is an internal block diagram of the portable terminal according to Embodiment 2 of the present invention.

It is preferred that the electronic equipment 1 is further provided with a control means for switching between the first heat discharging path and the second heat discharging path. FIG. 12 is an internal block diagram of the portable terminal according to Embodiment 2 of the present invention. FIG. 12 shows only elements necessary to explain control by the control means (i.e., all the other elements are not shown here).

The portable terminal 2 is provided with a control means 50. However, the control means 50 may be provided for the external device 3 rather than for the portable terminal 2.

A temperature measuring part 10 measures the temperature of the portable terminal 2. The temperature measuring part 10 measures the temperature of the portable terminal 2 by a variety of parameters including the temperature of the exothermic body 4, the temperatures of a plurality of the exothermic bodies 4, an average value of the temperatures of a plurality of exothermic bodies 4, the surface temperature of the portable terminal 2, and an average value of the temperatures at a plurality of positions of the portable terminal 2.

The temperature measuring part 10 informs the control means 50 of the measured temperature of the portable terminal 2.

The control means 50 decides whether to select the first heat discharging path or the second heat discharging path depending on the temperature of the portable terminal 2. As described above, the control means 50 selects the second heat discharging path when the temperature of the portable terminal 2 is too high because heat in the portable terminal 2 should be transferred to the external device 3 immediately. When the temperature of the portable terminal 2 is not so high, the control means 50 selects the first heat discharging path because the top priority should be given to the maximization of the heat discharging capability of the entire electronic equipment 1.

The control means 50 judges whether to select the first condition or the second condition based on the results received from the temperature measuring part 10.

In the case of the first condition, the control means 50 selects the first heat discharging path. In the first heat discharging path, the thermal connection between the first heat conducting path 5 and the first heat discharging means 6 is maintained.

On the other hand, in the case of the second condition, the control means 50 selects the second heat discharging path. In the second heat discharging path, the thermal connection between the first heat conducting path 5 and the first heat discharging means 6 is shut down or reduced.

Figure 13:
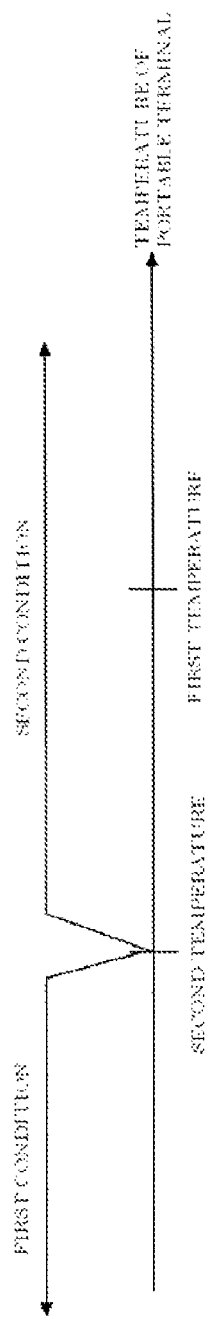
FIG. 13 is an explanatory view showing the state of judging a first condition and a second condition according to Embodiment 2 of the present invention.

The control means 50 judges whether to select the first condition or the second condition based on an example as shown in FIG. 13.

In FIG. 13, a straight line on the X-axis shows the temperature of the portable terminal 2 as a parameter. The straight line shows the first temperature at which the function and performance of the portable terminal 2 may be restricted and the second temperature that is lower than the first temperature. The second temperature is lower than the first temperature yet indicates that the temperature of the portable terminal 2 is very high. If it is equal to or greater than the second temperature, the temperature of the portable terminal 2 may reach or exceed the first temperature soon, resulting in the functional restriction of the portable terminal 2.

Accordingly, when the temperature of the portable terminal 2 is equal to or greater than the second temperature, heat in the portable terminal 2 should be transferred to the external device 3 as soon as possible. On the other hand, when it is lower than the second temperature, heat in the portable terminal 2 be preferably discharged at higher heat discharging capability.

Hence, the control means 50 judges the first condition as a condition for deciding the heat discharging path when the temperature of the portable terminal 2 is lower than the second temperature and the second condition as a condition for deciding the heat discharging path when it is equal to or greater than the second temperature. In other words, when the temperature of the portable terminal 2 is lower than the second temperature, the control means 50 judges the first condition and selects the first heat discharging path. When it is equal to or greater than the second temperature, the control means 50 judges the second condition and selects the second heat discharging path.

When the first heat discharging path is selected under the first condition, heat in the electronic equipment 1 provided with the portable terminal 2 and the external device 3 is discharged at high heat discharging capability. As a result, the portable terminal 2 is cooled to a sufficiently low level of temperature.

When the second heat discharging path is selected under the second condition, heat in the portable terminal 2 is transferred to the external device 3 quickly to be discharged from the external device 3, thereby preventing the functional restriction of the portable terminal 2. Although the cooling of the portable terminal 2 is insufficient, this method is effective in that the functional restriction can be prevented first of all when the temperature of the portable terminal 2 is too high.

It is also preferred that the second heat discharging path is selected first to transfer heat in the portable terminal 2 to the external device 3 and then the first heat discharging path is selected to discharge heat generated from the exothermic body 4 at high heat discharging efficiency. It is not excluded to set the first temperature as the same temperature as the second temperature.

The portable terminal 2 has a wide variety of functions including a communication function, a display function, an image compression function, an image extension function, a sound compression function, and a sound extension function. For example, if the portable terminal 2 is a portable phone and a user transmits mail with an image using the portable phone, the portable phone executes an image compression function, a display function and a communication function simultaneously. The temperature of the portable terminal 2 may rise when many of those functions are executed during the same period depending on the circumstances.

As described above, the function of the portable terminal 2 is restricted as a result of such a rise in temperature. The function of the portable terminal 2 may be restricted based on individual functions executed more than a prescribed volume simultaneously rather than based on the temperature measured at the temperature measuring part 10. In this case, the processing unit 11 restricts the function of the portable terminal 2 based on the number and amount of individual functions executed simultaneously. To take just one example, the processing unit 11 has a software program that restricts the function of the portable terminal 2 when the number and amount of individual functions executed simultaneously reach or exceed a prescribed volume.

In the case that the function of the portable terminal 2 is restricted as a result of individual functions more than a prescribed volume being executed, the processing unit 11 does not need to restrict the function of the portable terminal 2 if the heat discharging capability is increased (or heat of the portable terminal 2 is transferred to the external device quickly) as a result of the coupling between the portable terminal 2 and the external device 3. Accordingly, the processing unit 11 may not restrict the function of the portable terminal 2 based on information about the coupling between the portable terminal 2 and the external device 3.

Figure 14:
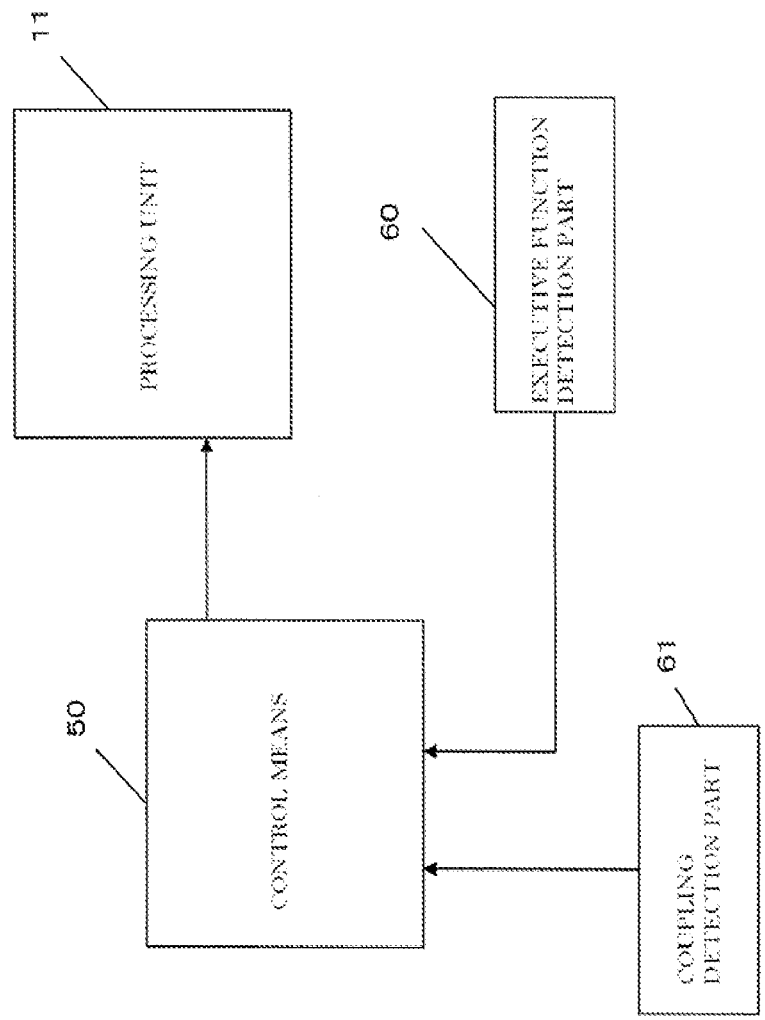
FIG. 14 is an internal block diagram of the portable terminal according to Embodiment 2 of the present invention.

Referring to FIG. 14, an executive function detection part 60 detects the number and amount of individual functions executed by the portable terminal 2. When the number and amount of individual functions executed by the portable terminal 2 simultaneously exceeds a prescribed volume as detected by the executive function detection part 60, the control means 50 informs the processing unit 11 of the result. After receiving the information, the processing unit 11 restricts the function and performance of the portable terminal 2.

The processing unit 11 may allow executing the function of the portable terminal 2 or restricts the function and performance of the portable terminal 2.

Moreover, the portable terminal 2 is provided with a coupling detection part 61. The coupling detection part 61 detects the coupling between the portable terminal 2 and the external device 3. As an example, when the portable terminal 2 and the external device 3 are coupled to each other, a connector for receiving and transmitting electric signals connects the portable terminal 2 to the external device 3. As a result of this connection by the connector, a new electric signal is generated in the portable terminal 2. The coupling detection part 61 detects the coupling between the portable terminal 2 and the external device 3 by detecting the electric signal thus generated.

After the coupling detection part 61 detects the coupling between the portable terminal 2 and the external device 3, heat in the portable terminal 2 is transferred to the external device 3 or discharged by both the portable terminal 2 and the external device 3. As a result, the processing unit 11 does not need to restrict the function of the portable terminal 2.

The coupling detection part 61 outputs the detected result to the control means 50. Based on this result, the control means 50 informs the processing unit 11 that the portable terminal 2 and the external device 3 has been coupled to each other. Based on this information, the processing unit 11 avoid restricting the function and performance of the portable terminal 2 even when individual functions more than a prescribed volume is being executed simultaneously. This is because the processing unit 11 can judge that the temperature of the portable terminal 2 is unlikely to rise too high.

The executive function detection part 60 and the coupling detection part 61 may be elements independent of the control means 50 or included in the control means 50 as the same element. The control means 50, the executive function detection part 60, the coupling detection part 61 and the processing unit 11 may be activated either by software or by hardware in whole or in part.

Thus, it is also preferred that the function of the portable terminal 2 not be restricted by means of the coupling between portable terminal 2 and the external device 3 even when individual functions more than a prescribed volume are executed simultaneously.

Furthermore, the processing unit 11 and the control means 50 may restrict the function and performance of the portable terminal 2 based on both the volume of individual functions executed simultaneously and the temperature of the portable terminals 2. In this case, the processing unit 11 may lift the functional restriction of the portable terminal 2 based on both the detection of the coupling between the portable terminal 2 and the external device 3 and the temperature of the portable terminal 2.

As described above, the electronic equipment 1 according to Embodiment 2 can discharge heat flexibly depending on the temperature of the portable terminal 2. Moreover, the electronic equipment 1 can select whether to restrict the function of the portable terminal 2 or not based on not only the temperature of the portable terminal 2 but the volume of individual functions executed by the portable terminal 2 as well.

In Embodiment 3, we describe a heat discharging system and a heat discharging method with regard to a portable terminal and an external device to be coupled thereto. Electronic equipment having a configuration capable of achieving the heat discharging function as described in Embodiments 1 and 2 can be manufactured and sold. In addition, the heat discharging function may be added to a general-purpose portable terminal and a general-purpose external device later or a general-purpose portable terminal and a general-purpose external device is enabled to achieve the heat discharging function. This may be understood as a heat discharging system and a heat discharging method.

Figure 15:
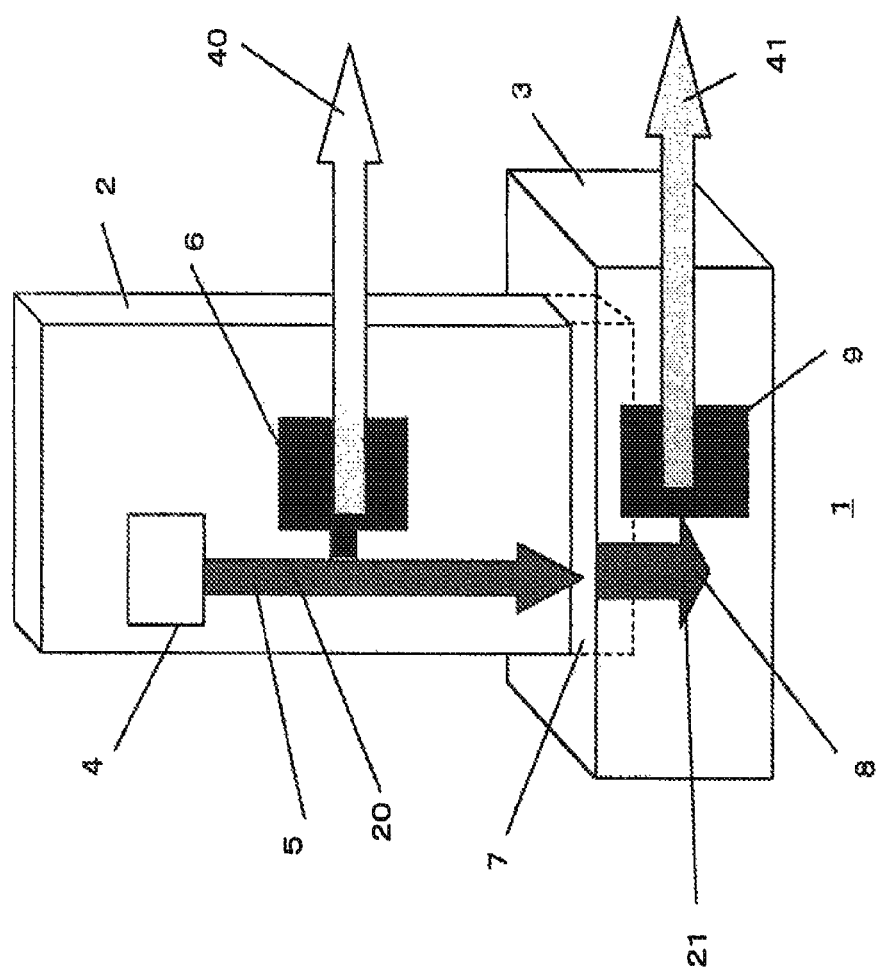
FIG. 15 is a schematic view explaining a heat discharging system or a heat discharging method according to Embodiment 3 of the present invention.
Figure 16:
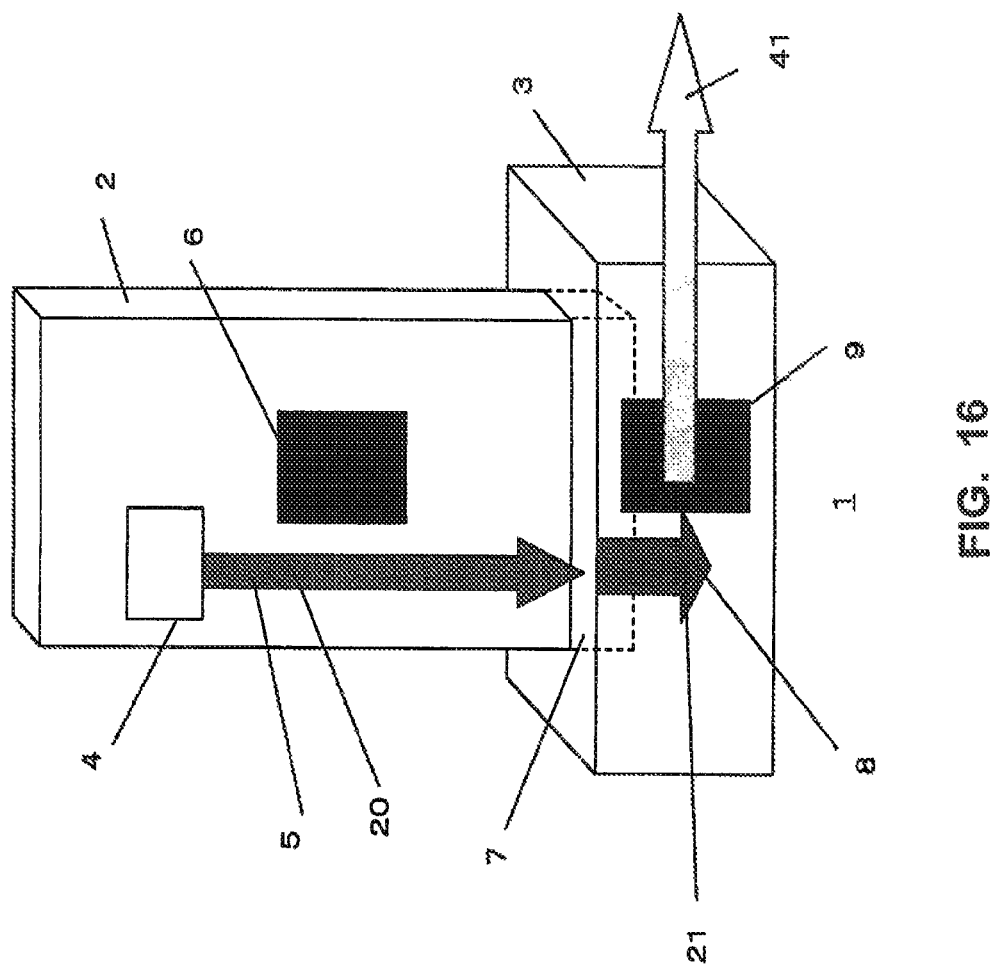
FIG. 16 is a schematic view explaining a heat discharging system or a heat discharging method according to the Embodiment 3 of the present invention.

The heat discharging system or the heat discharging method as shown in FIGS. 15 and 16 are those in the portable terminal 2 whose function is restricted at the prescribed first temperature and the external device 3 couplable to the portable terminal 2. The configuration and function of the portable terminal 2 and the external device 3 are the same as those described in Embodiments 1 and 2. The portable terminal 2 includes electronic equipment having a signal processing function for users to execute specific purposes while carrying them such as a portable phone, a portable music reproducer, a portable mail terminal, a PDA, a digital camera, a digital video camera, a portable recorder, a smart phone, and a portable moving picture imaging device.

The external device 3 is at least one of an extension unit for receiving and transmitting electric signals from and to the portable terminal 2 and a charging unit for charging electric power to the portable terminal 2. The external device 3 may be a single extension unit, an extension unit having a charging function, or a charger having a function of receiving and transmitting electric signals.

The extension unit may be relaying equipment for retrieving data in order to download images and sound data stored in a memory device of the portable terminal 2 (e.g., a semiconductor memory, a hard disk drive, a flash memory, a memory card, and a memory stick) to a personal computer and server equipment or relaying equipment for transferring data stored in a personal computer and server equipment to a memory device or a processor of the portable terminal 2.

The portable terminal 2 is provided with the exothermic body 4, the first heat conducting path 5 for conducting heat generated from the exothermic body 4 and the first heat discharging means 6 for discharging heat transferred through the first heat conducting path 5. As described in Embodiments 1 and 2, the portable terminal 2 is restricted in its function and performance when its temperature reaches the prescribed first temperature.

The external device 3 is provided with the second heat conducting path 8 to be thermally connected to the first heat conducting path 5 at a time when the portable terminal 2 and the external device 3 are coupled to each other, and the second heat discharging means 9 for discharging heat conducted through the second heat conducting path 8.

When the portable terminal 2 is inserted into the attaching part 7 to be coupled to the external device 3, the first heat conducting path 5 and the second heat conducting path 8 are thermally connected. As a result, heat generated from the exothermic body 4 is discharged from two heat discharging paths, that is, a heat discharging path for discharging heat from the first heat conducting path 5 via the first heat discharging means 6 (as shown with an arrow 40) and a heat discharging path for discharging heat from the second heat conducting path 8 via the second heat discharging means 9 (as shown with an arrow 41). Thus, heat generated from the exothermic body 4 is discharged at high heat discharging capability with a combined heat discharging means of the first heat discharging means 6 in the portable terminal 2 and the second heat discharging means 9 in the external device 3.

On the other hand, a user may want to transfer heat generated from the exothermic body 4 to the external device 3 from portable terminal 2 as soon as possible rather than discharging it at high heat discharging capability.

As shown in FIG. 13, for example, the temperature of the portable terminal 2 has a first temperature and a second temperature, which is lower than the first temperature, as its standard. The temperature lower than the second temperature shows the state in which the temperature of portable terminal 2 may rise any time soon, yet the function of the portable terminal 2 may not be immediately restricted. On the other hand, the second temperature or above shows the state in which the function of the portable terminal 2 may be immediately restricted.

Accordingly, when the temperature of the portable terminal 2 is at the second temperature or above in the vicinity of the first temperature, heat of the exothermic body 4 should preferentially be transferred to another place from the portable terminal 2 rather than being discharged by the portable terminal 2 and the external device 3. Therefore, the heat discharging system as shown in FIG. 16 is used at a time when the temperature of the portable terminal 2 is at the second temperature or above.

In FIG. 16, the thermal connection between the first heat conducting path 5 and the first heat discharging means 6 is shut down or reduced. As a result, the heat discharging route from the first heat discharging means 6 (as shown with an arrow 40) scarcely functions, and the heat discharging route from the second heat discharging means 9 (as shown with an arrow 41) mainly discharges heat from the exothermic body 4. Since the heat from the exothermic body 4 is mainly discharged from the external device 3, the heat discharging capability of this heat discharging system is low. However, the heat from the exothermic body 4 hardly remains in the portable terminal 2 because the heat is scarcely discharged from the first heat discharging means 6 in the portable terminal 2 yet transferred to the external device 3 immediately. As a result, the temperature of the portable terminal 2 immediately declines to a certain degree, whereby the possibility of the temperature rising to the first temperature or above at which the function of the portable terminal 2 is restricted can be avoided earlier.

It is decided depending on the temperature of the portable terminal 2 whether the heat discharging system selects the combined heat discharging routes as shown with the arrows 40 and 41 in FIG. 15 or the heat discharging route as shown with the arrow 41 in FIG. 16. Alternatively, it may be selected based on the number and volume of functions executed by the portable terminal 2 simultaneously.

Thus, the heat discharging system and heat discharging method in Embodiment 3 enables to reduce the necessity of restricting the function of the portable terminal 2, whereby a user can make use of the function and performance of the portable terminal 2 to the full.

While a preferred embodiment of the Present Application is shown and described, it is envisioned that those skilled in the art may devise various modifications without departing from the spirit and scope of the foregoing Description and the appended Claims.

What is claimed is:

1. Electronic equipment comprising:
   a portable terminal comprises:
   an exothermic body;
   a first heat conducting path for conducting exothermic heat from the exothermic body; and
   a first heat discharging means for discharging the exothermic heat conducted through the first heat conducting path,
   wherein a function and performance of the portable terminal is restricted at a prescribed first temperature or above, and the function and performance of the portable terminal is not restricted below the prescribed first temperature;
   an external device couplable to the portable terminal, the external device comprises:
   a second heat conducting path to be thermally connected to the first heat conducting path; and
   a second heat discharging means for discharging the exothermic heat conducted through the second heat conducting path,
   a control means for controlling the heat discharging path of the exothermic body,
   wherein when the portable terminal is coupled to the external device, the control means maintains a thermal connection between the first heat conducting path and the first heat discharging means under a first condition, the first condition is when the portable terminal is below a prescribed second temperature and shuts down or reduces the thermal connection between the first heat conducting path and the first heat discharging means under a second condition, the second condition when the portable terminal is equal to or greater than the second temperature, the second temperature being equal to or less than the first temperature.

2. The electronic equipment having the heat discharging function of claim 1, wherein: the first heat conducting path and the second heat conducting path are thermally connected to each other when the portable terminal is coupled to the external device; and the exothermic heat from the exothermic body is discharged by the first heat discharging means and the second heat discharging means.

3. The electronic equipment having the heat discharging function of claim 1, wherein: the first heat conducting path and the second heat conducting path are thermally connected to each other and the thermal connection between the first heat conducting path and the first heat discharging means shut down or reduced when the portable terminal is coupled to the external device; and wherein the exothermic heat from the exothermic body is discharged mainly by the second heat discharging means.

4. The electronic equipment having the heat discharging function according to claim 1, wherein the control means detects the coupling between the portable terminal and the external device and outputs a detection result to a processing device of the portable terminal.

5. The electronic equipment having the heat discharging function according to claim 1, wherein the first heat conducting path and the second heat conducting path are thermally connected to each other through a heat conducting path of a connector, the connector receiving and transmitting signals between the portable terminal and the external device.

6. The electronic equipment having the heat discharging function according to claim 1, wherein the first heat conducting path is a terminal housing of the portable terminal and the second heat conducting path a device housing of the external device, the first heat conducting path and the second heat conducting path being thermally connected to each other when the portable terminal is coupled to the external device as a result of the terminal housing and the device housing being thermally brought into contact with each other.

7. The electronic equipment having the heat discharging function according to claim 1, wherein the portable terminal is a portable phone, a portable music reproducer, a portable mail terminal, a PDA, a digital camera, a digital video camera, a portable recorder, a smart phone or a portable moving picture imaging device.

8. The electronic equipment having the heat discharging function according to claim 1, wherein the external device is at least one of an extension unit for receiving and transmitting electric signals from and to the portable terminal and a charging unit for charging electric power to the portable terminal.

9. A heat discharging system based on a portable terminal: the portable terminal comprises:
   an exothermic body;
   a first heat conducting path for conducting exothermic heat from the exothermic body; and
   a first heat discharging means for discharging the exothermic heat conducted through the first heat conducting path,
   wherein a function and performance of the portable terminal is restricted at a prescribed first temperature or above, and the function and performance of the portable terminal is not restricted below the prescribed first temperature;
   an external device couplable to the portable terminal, the external device comprises:
   a second heat conducting path to be thermally connected to the first heat conducting path; and
   a second heat discharging means for discharging the exothermic heat conducted through the second heat conducting path,
   a control means for controlling the heat discharging path of the exothermic body,
   wherein when the portable terminal is coupled to the external device, the control means maintains a thermal connection between the first heat conducting path and the first heat discharging means under a first condition, the first condition is when the portable terminal is below a prescribed second temperature and shuts down or reduces the thermal connection between the first heat conducting path and the first heat discharging means under a second condition, the second condition when the portable terminal is equal to or greater than the second temperature, the second temperature being equal to or less than the first temperature, the portable terminal being restricted at a prescribed first temperature or above, and an external device couplable to the portable terminal, wherein the portable terminal comprises: an exothermic body; a first heat conducting path for conducting heat from the exothermic body; and a first heat discharging means for discharging heat conducted through the first heat conducting path; wherein the external device comprises: a second heat conducting path to be thermally connected to the first heat conducting path; and a second heat discharging means for discharging heat conducted through the second heat conducting path.

10. The heat discharging system of claim 9, wherein:
the first heat conducting path and the second heat conducting path are thermally connected to each other when the portable terminal is coupled to the external device; and
exothermic heat from the exothermic body is discharged by the first heat discharging means and the second heat discharging means.

11. The heat discharging system of claim 9, wherein:
the first heat conducting path and the second heat conducting path are thermally connected to each other and the thermal connection between the first heat conducting path and the first heat discharging means shut down or reduced when the portable terminal is coupled to the external device; and
exothermic heat from the exothermic body is discharged mainly by the second heat discharging means.

12. A heat discharging method based on a portable terminal the portable terminal comprises:
an exothermic body;
a first heat conducting path for conducting exothermic heat from the exothermic body; and
a first heat discharging means for discharging the exothermic heat conducted through the first heat conducting path,
wherein a function and performance of the portable terminal is restricted at a prescribed first temperature or above, and the function and performance of the portable terminal is not restricted below the prescribed first temperature;
providing an external device couplable to the portable terminal, the external device comprises:
a second heat conducting path to be thermally connected to the first heat conducting path; and
a second heat discharging means for discharging the exothermic heat conducted through the second heat conducting path,
providing a control means for controlling the heat discharging path of the exothermic body,
wherein when the portable terminal is coupled to the external device, the control means maintains a thermal connection between the first heat conducting path and the first heat discharging means under a first condition, the first condition is when the portable terminal is below a prescribed second temperature and shuts down or reduces the thermal connection between the first heat conducting path and the first heat discharging means under a second condition, the second condition when the portable terminal is equal to or greater than the second temperature, the second temperature being equal to or less than the first temperature.

13. The heat discharging method of claim 12, wherein:
the first heat conducting path and the second heat conducting path are thermally connected to each other when the portable terminal is coupled to the external device; and
exothermic heat from the exothermic body is discharged by the first heat discharging means and the second heat discharging means.

14. The heat discharging method of claim 12, wherein:
the first heat conducting path and the second heat conducting path are thermally connected to each other and the thermal connection between the first heat conducting path and the first heat discharging means shut down or reduced when the portable terminal is coupled to the external device; and
exothermic heat from the exothermic body is discharged mainly by the second heat discharging means.

* * * * *